United States Patent [19]

Shinomiya et al.

[11] Patent Number: 4,875,960
[45] Date of Patent: Oct. 24, 1989

[54] APPARATUS AND METHOD FOR MANUFACTURING TUBULAR MEMBER

[75] Inventors: Tsutomu Shinomiya; Eichi Yoshino, both of Sapporo; Chihiro Maki, Saitama; Hitoshi Tojima, Kasukabe; Sadamu Izai, Iwatsuki; Akiro Nakata, Ageo; Michiya Tamura, Iwatsuki, all of Japan

[73] Assignee: Hokkai Can Co., Ltd., Tokyo, Japan

[21] Appl. No.: 167,863

[22] Filed: Mar. 14, 1988

[30] Foreign Application Priority Data

| Mar. 14, 1987 | [JP] | Japan | 62-57963 |
| Mar. 23, 1987 | [JP] | Japan | 62-65813 |
| Apr. 30, 1987 | [JP] | Japan | 62-104795 |
| Jul. 3, 1987 | [JP] | Japan | 62-101777 |

[51] Int. Cl.$^4$ ............................................. B29D 23/10
[52] U.S. Cl. ................................... 156/203; 156/466; 493/302
[58] Field of Search ............... 156/203, 217–218, 156/466; 493/302

[56] References Cited

U.S. PATENT DOCUMENTS

| 2,521,007 | 9/1950 | Heinmets | 493/302 |
| 2,580,665 | 1/1952 | Dunning et al. | 493/302 X |
| 2,933,988 | 4/1960 | Stark | 493/302 |
| 3,304,844 | 2/1967 | Hosenfeld | 493/302 X |
| 3,323,964 | 6/1967 | Young | 156/466 X |
| 3,575,769 | 4/1971 | Radzio | 156/466 |
| 4,353,764 | 10/1982 | Sireix | 156/218 X |
| 4,474,564 | 10/1984 | Sireix | 493/302 X |
| 4,478,670 | 10/1984 | Heyse et al. | 156/466 X |

Primary Examiner—David Simmons
Attorney, Agent, or Firm—Birch, Stewart, Kolasch & Birch

[57] ABSTRACT

A tubular member is manufactured by by continuously supplying a plurality of elongate flexible webs while positionally displacing the webs in overlapping relation with side edges thereof arranged in a staircase configuration, progressively bending the webs along a mandrel, bonding the webs with adhesive layers interposed therebetween to form a tubular member, and joining the displaced side edges to complete the tubular member. The webs are supplied in mutually spaced-apart relation under longitudinal tension. A plurality of resilient support plate members are disposed respectively for the webs and arranged to lie along the lower surfaces of the webs transversely thereof. Opposite ends of the support plate members are supported for movement vertically and toward and away from each other. The opposite ends of the support plate members are movable toward each other to curve the support members along about an outer peripheral surface of a mandrel. A positioning arrangement has a pair of guide members mounted on an inner surface of each of the support plate members for engaging opposite side edges of one of the webs.

10 Claims, 23 Drawing Sheets

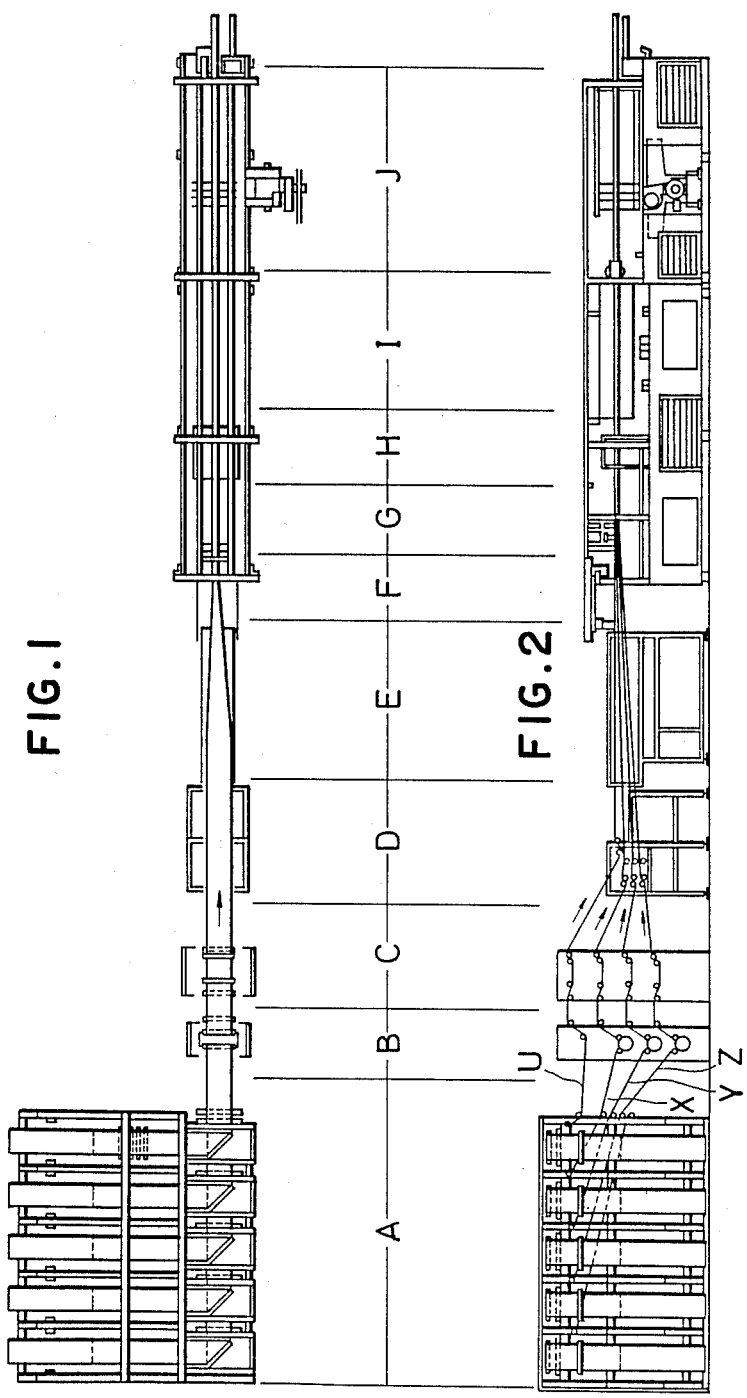

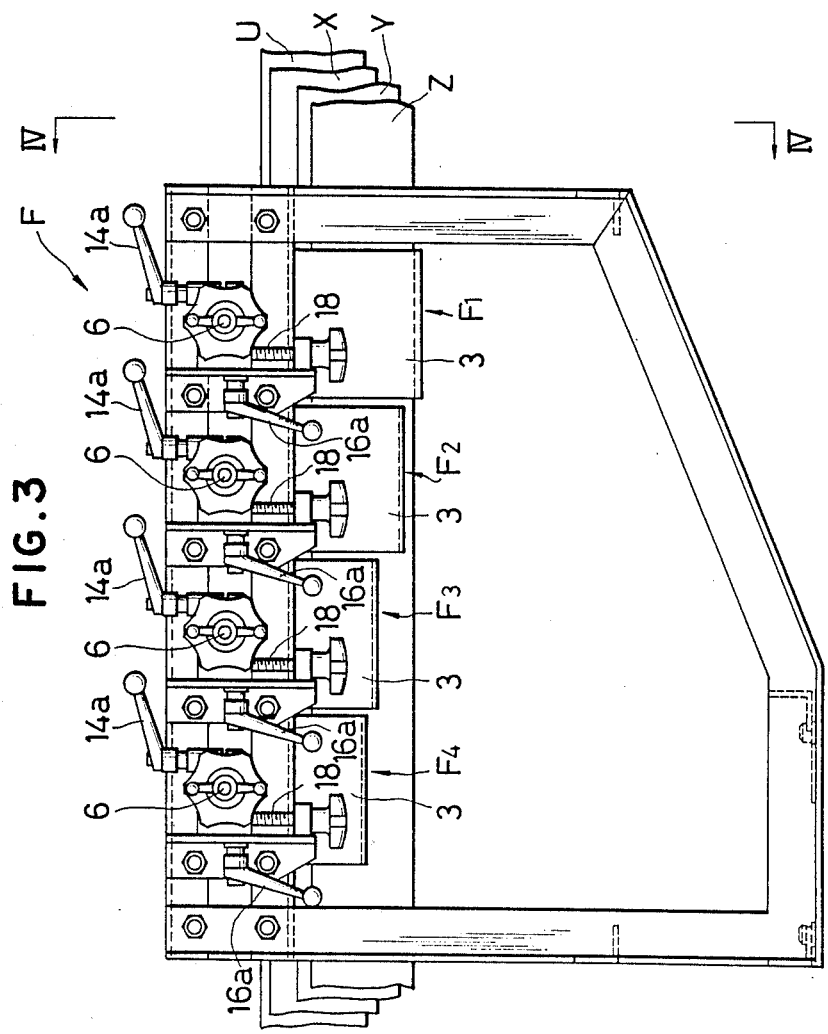

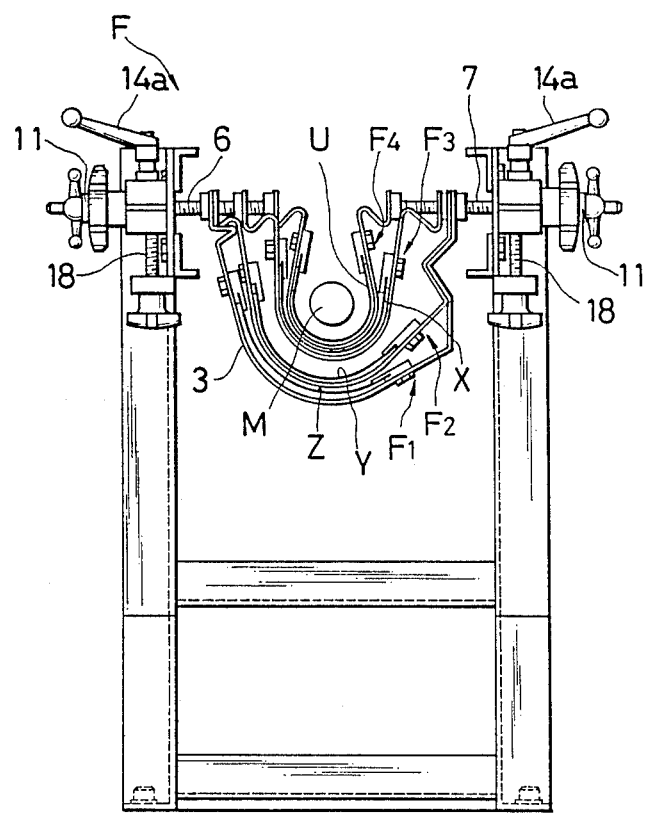

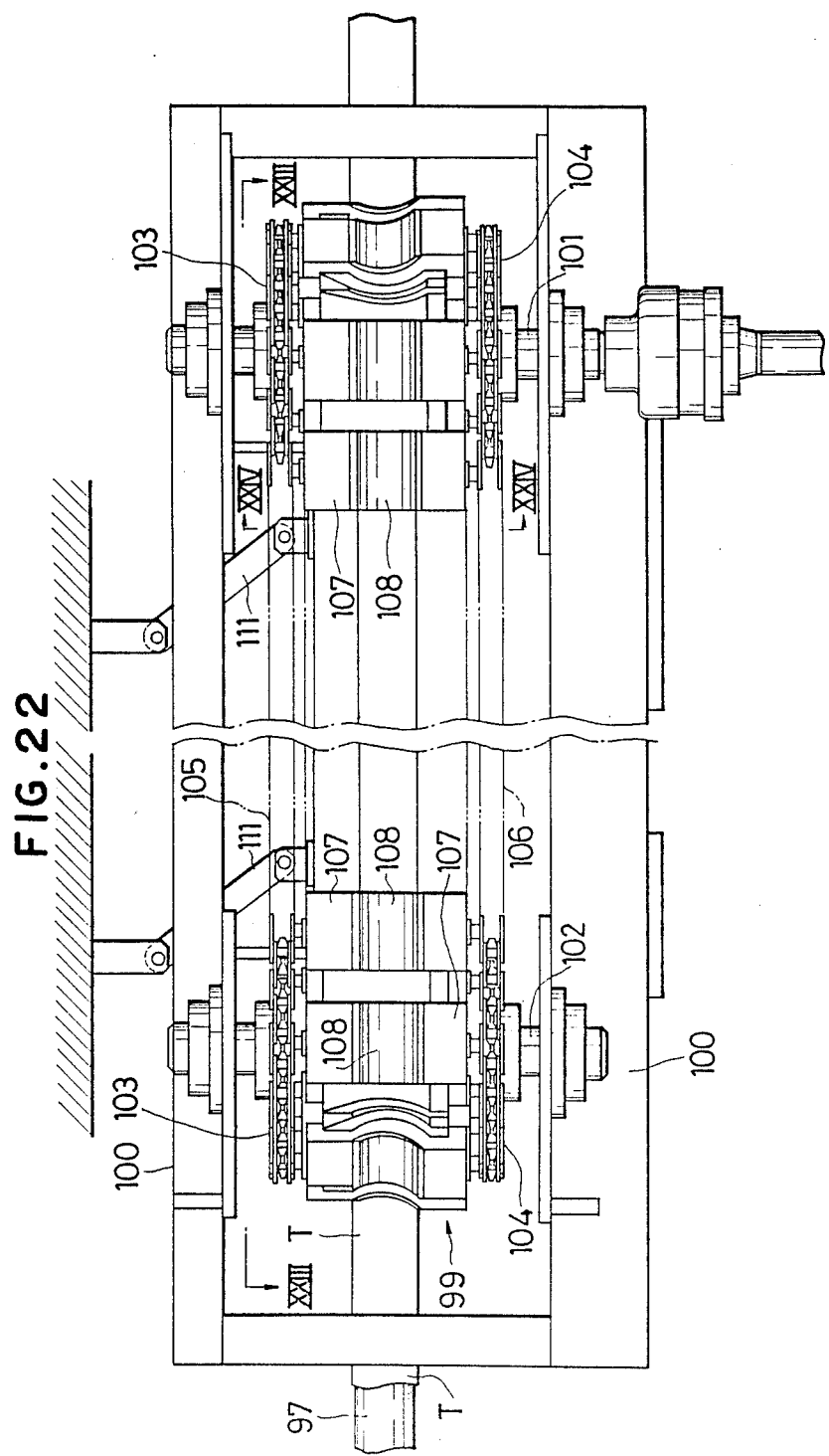

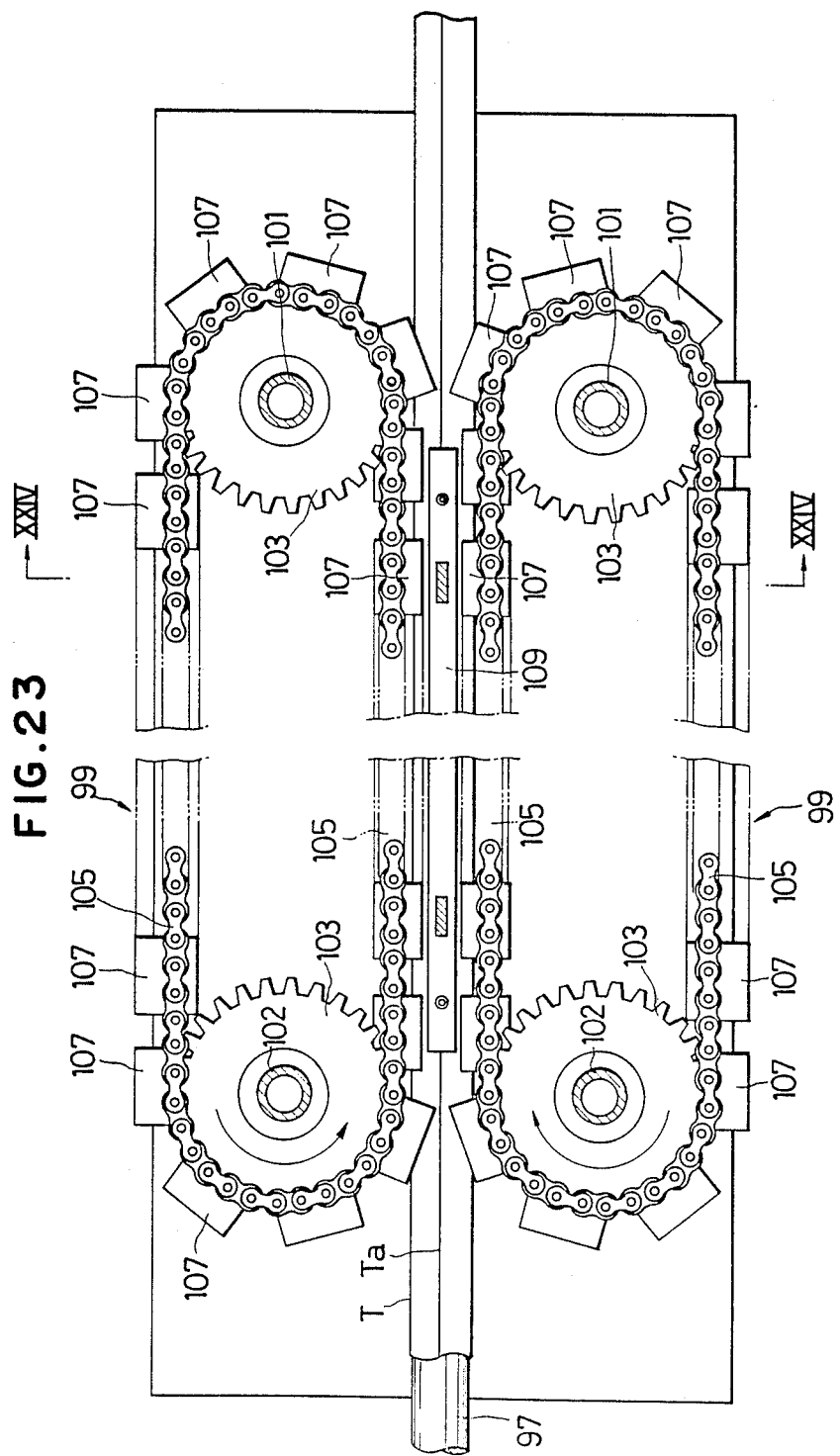

APPARATUS AND METHOD FOR MANUFACTURING TUBULAR MEMBER

BACKGROUND OF THE INVENTION

The present invention relates to an apparatus and a method for continuously manufacturing a tubular member by overlapping and bonding flexible webs or strips as a plurality of layers.

Methods and apparatus for forming tubular members are known as proposed in Japanese Patent Publications Nos. 57-61582 and 60-35254 corresponding respectively to U.S. Pat. Nos. 4,474,564 and 4,353,764, both issued to Sireix.

According to the proposed methods, a plurality of flexible webs or strips are overlapped in transversely shifted positions so that their side edges are shaped like a staircase. The overlapped webs are first bonded at narrow areas thereof positioned intermediate between their opposite side edges, and then progressively bent around a mandrel into a tubular form. At the same time, the widths of the bonded areas of the overlapped webs are progressively increased toward the opposite side edges until the opposite side edges are joined. Then, the opposite edges of the positionally shifted webs are held in abutment against and coupled to each other thereby to continuously form a complete tubular member, which is withdrawn along the mandrel and then cut off to a suitable length.

By progressively increasing the bonded areas when forming the tubular member, the bonded areas of the webs are prevented from being wrinkled.

Where the adhesive used is a water-soluble adhesive, and when the bonded areas are progressively increased, the bonded strips are allowed to be positionally displaced for a relatively long period of time after they have been bonded, because the adhesive is of a liquid state. Therefore, no special care is required during the bonding process at the time of progressively increasing the bonded areas.

However, use of the water-soluble adhesive is problematic for the following reasons. A long period of time is required for the water-soluble adhesive to be dried. In case the formed tubular member is used as the barrel of a container for storing a liquid, a water-resistant layer must be added as an outermost or innermost layer. With the water-resistant layer added, the adhesive cannot easily be dried. Therefore, if a tubular member for use as a liquid container is to be manufactured, then it is preferable to employ a hot-melt adhesive which does not need to be dried.

When the hot-melt adhesive is applied to form a tubular member form webs, the webs are firmly secured to each other at the same time that the they are bonded by the hot-melt adhesive. Unless, therefore, the webs are uniformly bonded even at localized areas thereof, the webs are subjected to wrinkles, giving rise to non-bonded areas which tend to reduce the pressure resistance of the produced tubular member. Thus, with the use of the hot-melt adhesive, any tubular member of high quality cannot be formed simply by progressively increasing the bonded areas.

As described above, it is time-consuming for the water-soluble adhesive to be dried before a tubular member is formed. Accordingly, if the tubular member being formed is to be continuously cut to desired lengths, the speed at which the tubular member is formed should be lowered.

The hot-melt adhesive is advantageous over the water-soluble adhesive since the speed at which the tubular member is formed can be increased with the hot-melt adhesive being relied upon.

Even where the hot-melt adhesive is used, however, because a number of webs are bonded as layers by the hot-melt adhesive, it takes some time before the adhesive layers between the webs bond them to the extent that can withstand tensile forces which will be applied to the formed tubular member. In the tubular member of this structure, the opposite side edges of the webs are finally bonded. Consequently, unless these portions are reliably bonded together, the joined areas may be opened and the tubular member may be broken when the tubular member is withdrawn and cut off. To allow the tubular member to be withdrawn and cut off without damage or breakage, a period of time should be permitted to elapse until the joined areas are completely bonded together. This prevents the rate of production of the tubular member from being increased.

According to Japanese Patent Publication No. 60-35254, the joined opposite side edges of the webs are held in abutment against each other as described above. This is advantageous in that even if the side edges of the webs are positionally displaced slightly when forming the tubular member, they can form joined areas.

With the structure of the abutting joined areas, however, it cannot provide a sufficient degree of pressure resistance when the tubular member is used as the barrel of a pressure-resistant container such as for containing a carbonated beverage.

There has been proposed a tubular member as disclosed in Japanese Laid-Open Utility Model Publication No. 61-43114. According to the disclosed arrangement, and as shown in FIG. 26 of the accompanying drawings of the present application, the side edges x1, x2, y1, y2, z1, z2 of webs X, Y, Z are overlapped with the outer side edge x2 abutting against the inner side edge y1 and the outer side edge y2 abutting against the inner side edge z1 for increasing the pressure resistance of the joined areas.

To accomplish the illustrated structure, the side edges of the webs X, Y, Z should be positioned such that the outer side edge x2 abuts against the inner side edge y1 and the outer side edge y2 abuts against the inner side edge z1. Otherwise, gaps would be created between the outer side edge x2 and the inner side edge y1 and between the outer side edge y2 and the inner side edge z1, thereby reducing the pressure resistance.

In the case where the formed tubular member is used as the barrel of a container of a beverage such as a carbonated beverage, an innermost layer U is required to give the container barrel water resistance and sealing capability.

The innermost layer U comprises a water-resistant layer as a gas barrier. The layer U and the webs X, Y, Z are wound around a mandrel to form a tubular member, and the opposite side edges of the layer U are joined to each other for sealing capability. More specifically, as shown in FIG. 26, the innermost layer U is formed as a tubular body, and its opposite side edges u1, u2 mate against each other, are bonded to each other, then folded to one side, and finally bonded to an outer surface of the tubular body.

Prior to the formation of the tubular member from the outer webs X, Y, Z, the innermost layer U is bent to its form along the mandrel so that the joined side edges u1, u2 will be disposed inside of the tubular member.

The webs U, X, Y, Z used to form the tubular member are in the form of elongate strips, which are continuously supplied along the mandrel. It is efficient to form the tubular member from the webs X, Y, Z after the innermost layer has been formed from the web U. Therefore, an apparatus is required to form the innermost layer.

SUMMARY OF THE INVENTION

It is an object of the present invention to provide an apparatus for continuously manufacturing a tubular member efficiently by overlapping and bonding flexible webs or strips as a plurality of layers.

Another object of the present invention is to provide an apparatus for continuously manufacturing a tubular member by overlapping and bonding flexible webs or strips as a plurality of layers with a hot-melt adhesive.

Still another object of the present invention is to provide an apparatus for continuously manufacturing a tubular member for use as a beverage container by overlapping and bonding a plurality of layers in the form of paper webs and another flexible water-resistant web.

A further object of the present invention is to provide an apparatus for continuously manufacturing a tubular member for use as a highly pressure-resistant container capable of containing a liquid, such as a sparkling beverage, which will exert a high internal pressure when filled in the container.

To achieve the above objects, there is provided in accordance with the present invention an apparatus for manufacturing a tubular member by continuously supplying a plurality of elongate flexible webs while positionally displacing the webs in overlapping relation with side edges thereof arranged in a staircase configuration, progressively bending the webs along a mandrel, bonding the webs with adhesive layers interposed therebetween to form a tubular member, and joining the displaced side edges to complete the tubular member, said apparatus comprising: a device for continuously supplying the webs in mutually spaced-apart relation while longitudinally tensioning the webs; a plurality of resilient support plate members disposed respectively for the webs and arranged to lie along the lower surfaces of the webs transversely thereof; a mandrel; devices supporting opposite ends of the support plate members for moving said opposite ends vertically and toward and away from each other, said devices being capable of moving said opposite ends of the support plate members toward each other to curve the support members along an outer peripheral surface of said mandrel; and a positioning device having a pair of guide members mounted on an inner surface of each of said support plate members for engaging opposite side edges of one of the webs.

The opposite ends of the support plate members are moved vertically and toward and away from each other by the respective supporting devices to move the guide members engaging the opposite side edges of the webs vertically and transversely of the webs without changing the curved shapes of the intermediate portions of the support plate members along the outer circumference of the mandrel. The webs are supported on the curved intermediate portions of the respective support plate members, and the side edges of the webs are positionally displaced transversely into a staircase shape and vertically overlapped. The side edges of the webs are positioned such that when the webs are bent along the mandrel into the tubular member, outer side edges of overlapping joined portions of webs are held in abutment against inner side edges of the joined portions of upper webs.

According to the present invention, there is also provided an apparatus for manufacturing a tubular member by continuously supplying a plurality of elongate flexible webs while positionally displacing the webs in overlapping relation with side edges thereof arranged in a staircase configuration, progressively bending the webs along a mandrel, bonding the webs with adhesive layers interposed therebetween to form a tubular member, and joining the displaced side edges to complete the tubular member, said apparatus comprising: a device for supplying the elongate webs in mutually spaced-apart relation while longitudinally tensioning the webs, each of the webs having a hot-melt adhesive on at least one surface thereof; a mandrel disposed to lie at an intermediate position between opposite side edges of an innermost one of the webs and extend along the webs; a device having a plurality of rollers each having a pressing surface complementary to a portion of an outer circumferential surface of the mandrel for pressing the webs against said mandrel, said rollers being positionally displaced longitudinally of said mandrel and successively partly overlapped circumferentially of said mandrel when viewed in an axial direction of the mandrel; and a device for heating the hot-melt adhesive to keep the same in a melted condition at least until the webs reach said rollers.

The hot-melt adhesive coated on each of the webs is melted by the heating device until the webs are shaped to tubular form. The webs are longitudinally tensioned to keep them spaced apart from each other immediately before the webs are bonded, and forces tending to press the webs against the mandrel are applied by the rollers and continuously impressed linearly at circumferential positions about the mandrel to shape the web into a tubular body. As the web is continuously fed along, the region in which each of the webs is bonded is progressively increased transversely to the full width of the webs, or from a certain circumferential position on the mandrel toward the entire circumferential surface about the mandrel. Therefore, non-bonded regions of the webs are progressively to eliminated. When the pressed regions of the webs are shifted circumferentially of the mandrel, any wrinkles of the webs are eliminated or released from the side edges thereof while the webs are being bonded.

The webs can be bonded in this manner by arranging the rollers each having a pressing surface complementary to a portion of an outer circumferential surface of the mandrel for pressing the webs against said mandrel, such that the rollers are positionally displaced longitudinally of the mandrel and successively partly overlapped circumferentially of the mandrel when viewed in an axial direction of the mandrel, and by pressing the rollers against the mandrel with the webs therebetween. Where the tubular member to be formed is of a circular or elliptical cross section, and hence the mandrel has a circular or elliptical cross section, the pressing surface of each of the rollers is of an arcuate shape along the outer circumferential surface of the mandrel, and the axis of rotation of each roller is normal to the axis of the mandrel. The rollers press the webs against the mandrel at the intermediate position on the arcuate pressing surfaces of the rollers.

Further according to the present invention, there is provided an apparatus for manufacturing a tubular member by continuously supplying a plurality of elongate flexible webs while positionally displacing the webs in overlapping relation with side edges thereof arranged in a staircase configuration, progressively bending the webs along a mandrel, bonding the webs with adhesive layers interposed therebetween to form a tubular member, and joining the displaced side edges to complete the tubular member, said apparatus comprising: a device for continuously supplying an innermost elongate web having a thermally fusible layer on a surface thereof facing the mandrel, while longitudinally tensioning the web; a mandrel disposed to lie at an intermediate position between opposite side edges of the web and having an outer circumferential length shorter than the distance between the opposite side edges of the web; a shaping/guiding device having a pair of semicylindrical shaping/guiding members for bending the web along said mandrel into a tubular body, said shaping/guiding members being movable toward and away from said mandrel and having lower edges disposed in confronting relation to each other at an intermediate position between the opposite side edges of web and upper edges disposed in confronting relation to each other near the opposite side edges of the tubular body; a fusing device for pressing with heat the opposite side edges of the web which project between said upper edges of the shaping/guiding member to fuse the confronting thermally fusible layers to join the opposite side edges; an adhesive coating device for coating a hot-melt adhesive to an outer surface of the joined opposite side edges; and a pressing device for pressing the outer surface coated with the hot-melt adhesive against an outer surface of the tubular body.

The web is continuously supplied along the mandrel by the supplying device so as to pass through the shaping/guiding members which bend the web along the mandrel into a tubular body. At this time, the opposite side edges of the web project between the upper edges of the shaping/guiding members and are held in mating relation to each other. The mating side edges are then pressed and heated by the fusing device to fuse the thermally fusible layers on the side edges to join them. Then, a hot-melt adhesive is coated on one surface of the joined side edges by the adhesive coating device, after which the coated surface is pressed and bonded to the outer surface of the tubular body by the pressing device, for thereby completing the tubular body.

Moreover, there is also provided an apparatus for manufacturing a tubular member by continuously supplying a plurality of elongate flexible webs while positionally displacing the webs in overlapping relation with side edges thereof arranged in a staircase configuration, progressively bending the webs along a mandrel, bonding the webs with a hot-melt adhesive interposed therebetween to form a tubular member, and joining the displaced side edges to complete the tubular member, said apparatus comprising: a cooling mandrel for guiding the completed tubular member fitted thereover; a withdrawing device for withdrawing the tubular member along said cooling mandrel; and a cooling body disposed in a position in which the joined portion of the tubular member passes, for abutting against the joined portion of the tubular member.

The tubular member formed from the webs with their opposite side edges joined is fitted over and cooled by the cooling mandrel, and the joined portion or seam of the tubular member is cooled by contact with the cooling body. Therefore, the bonding process using the hot-melt adhesive is finished in a short period of time.

The adhesive for bonding the webs which constitute a major portion of the tubular member should preferably be a hot-melt adhesive, as described above.

The hot-melt adhesive may be of a known nature and may be polyethylene, ethylene and ethylene copolymer, ethylene vinyl acetate copolymer, ethylene methyl methacrylate copolymer, ethylene ethyl acrylate copolymer, ethylene methyl acrylate copolymer, ethylene methyl acrylate maleic anhydride copolymer, ethylene acrylic acid copolymer, ethylene methacrylic acid copolymer, ionomer resin, polyamide resin, polyester resin, nylon resin, polypropylene resin, vinyl acetate copolymer resin, polymethyl methacrylate resin, or their mixture. This adhesive is applied to at least one surface of the webs. The intermediate webs may be coated with the adhesive on their opposite surfaces. The hot-melt adhesive may be coated on the webs in advance and reheated into a melted condition immediately before the webs are shaped into the tubular member. Alternatively, when forming the tubular member, the melted hot-melt adhesive may be applied to the webs. The hot-melt adhesive should be kept in the melted condition with heat until the webs are shaped into the tubular member.

The webs each with the adhesive layer are positionally displaced so that their side edges are in a staircase configuration, and overlapped in mutually spaced-apart relation. The webs are continuously supplied while being longitudinally tensioned. By thus continuously supplying the webs under longitudinal tension, the webs are maintained in mutually spaced-apart relation immediately before they are shaped into the tubular member.

The mandrel having an outer profile for defining the configuration of a tubular member is disposed at an intermediate position between the opposite side edges of the webs thus continuously supplied, and the webs are progressively bent along the outer circumference of the mandrel into a tubular form. It is important that the side edges of the webs are positioned such that the side edges are overlapped, and that overlapping outer side edges of webs are held in abutment against inner side edges of upper webs.

The webs constituting a major portion of the tubular member are made of a flexible material such as paper, plastic, metal foil, or their combination.

The webs are continuous elongate sheets, and the formed tubular body is thereafter cut off to a suitable length.

The web serving as an innermost layer of the tubular member is a sheet of paper, plastic, metal foil, or the like. This web has a thermally fusible synthetic resin layer on at least one surface thereof in order to allow the opposite side edges to be fused and joined. Where the web is to serve as a water-resistant innermost layer, it is preferable to employ a web of paper coated with a thermally fusible synthetic resin film.

The web is a continuous elongate sheet, and the formed tubular body is thereafter cut off to a suitable length together with the tubular body formed from the webs that constitute the major portion of the tubular member.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a schematic plan view of an apparatus for manufacturing a tubular member according to the present invention;

FIG. 2 is a front elevational view of the apparatus;

FIG. 3 is a front elevational view of a second positioning device;

FIG. 4 is a cross-sectional view taken along line IV—IV of FIG. 3;

FIG. 22 is a fragmentary front elevational view of a withdrawing device;

FIG. 23 is a cross-sectional view taken along line XXIII—XXIII of FIG. 22;

DESCRIPTION OF THE PREFERRED EMBODIMENT

FIGS. 1 and 2 schematically illustrate an apparatus for manufacturing a tubular member in accordance with the present invention.

The apparatus includes a feeding device A for continuously feeding a web U having a water-resistant gas barrier surface and a plurality of paper webs X, Y, Z, a preheating device B for heating the webs X, Y, Z so that they are uniformly dried, a first positioning device C for positionally shifting or displacing the webs in overlapping relation until side edges of the webs are arranged in a staircase configuration, an adhesive applicator device D for coating a hot-melt adhesive on mutually confronting surfaces of the webs U, X, Y, Z, a heating device E having a heating means for keeping the coated adhesive in a melted condition, a second positioning device F for accurately positioning the side edges of the webs again, a first forming device G for bending the web U along a mandrel to form an innermost layer of a tubular member, a second forming device H for bending the webs X, Y, Z along a mandrel to form the tubular member, a withdrawing device I for withdrawing the formed tubular member, and a cutting device J for cutting off the withdrawn tubular member to a suitable length.

The webs U, X, Y, Z are tensioned in their longitudinal direction by the withdrawing device I until they reach the first and second forming devices G, H.

The feeding device A, the preheating device B, the first positioning device C, and the cutting device J are of a conventional nature. The second positioning device F, the first forming device G, the second forming device H, and the withdrawing device I will hereinafter be described in detail.

FIGS. 3 and 4 illustrate the second positioning device F. The positioning device F has four positioning means F1, F2, F3, F4 of identical structure for positioning the four webs U, X, Y, Z, respectively. By way of example, the positioning means F2 will be described with reference to FIGS. 5 through 8.

Figure 5:
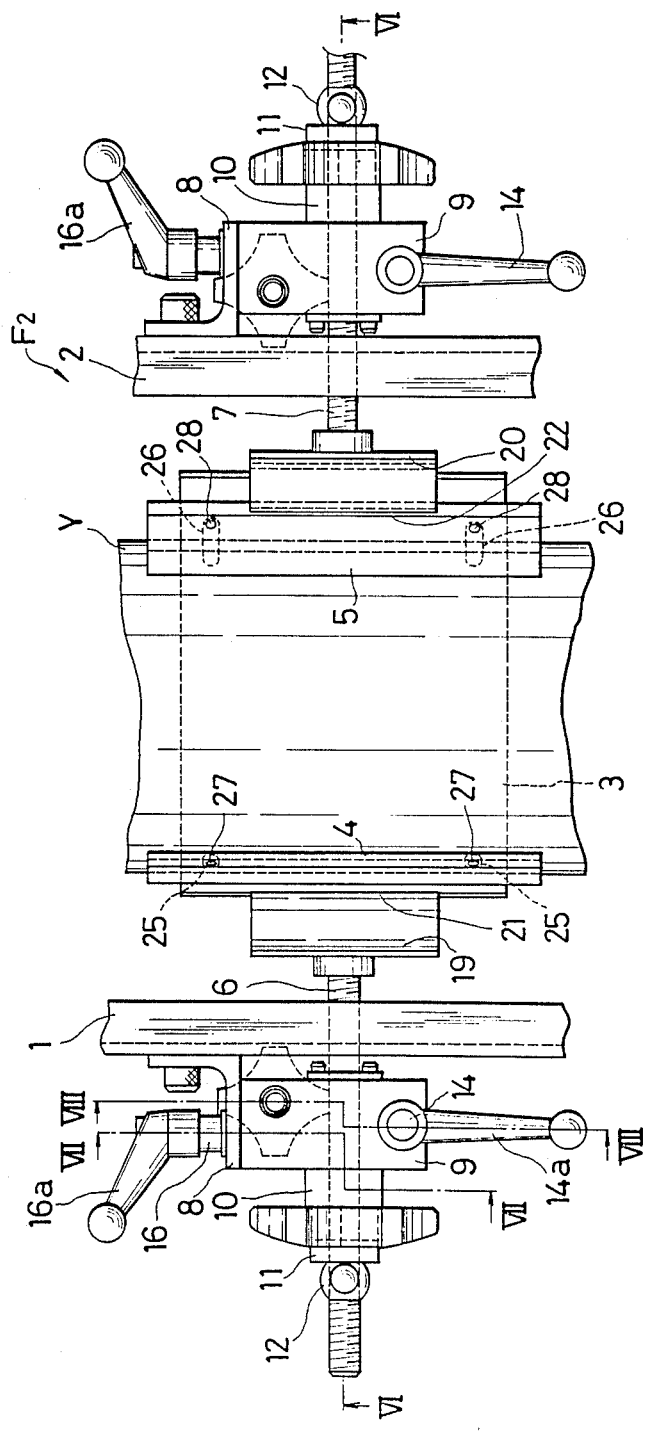
FIG. 5 is a fragmentary plan view of FIG. 4.

FIG. 5 shows the positioning means F2 in plan. The positioning means F2 comprises a support plate member 3 in the form of a steel sheet with its opposite ends supported by bases 1, 2 disposed parallel to the direction in which the web Y is supplied, a pair of guide members 4, 5 mounted on an upper surface of the support plate member 3 and extending therealong for engaging side edges of the web Y, and a pair of support rods 6, 7 supporting the opposite ends of the support plate member 3. The support rods 6, 7 are movable vertically with respect to the bases 1, 2, respectively, and are also movable toward and away from each other. The support rods 6, 7 can be moved by identical moving means, respectively, one of which will be described below by way of example.

Figure 6:
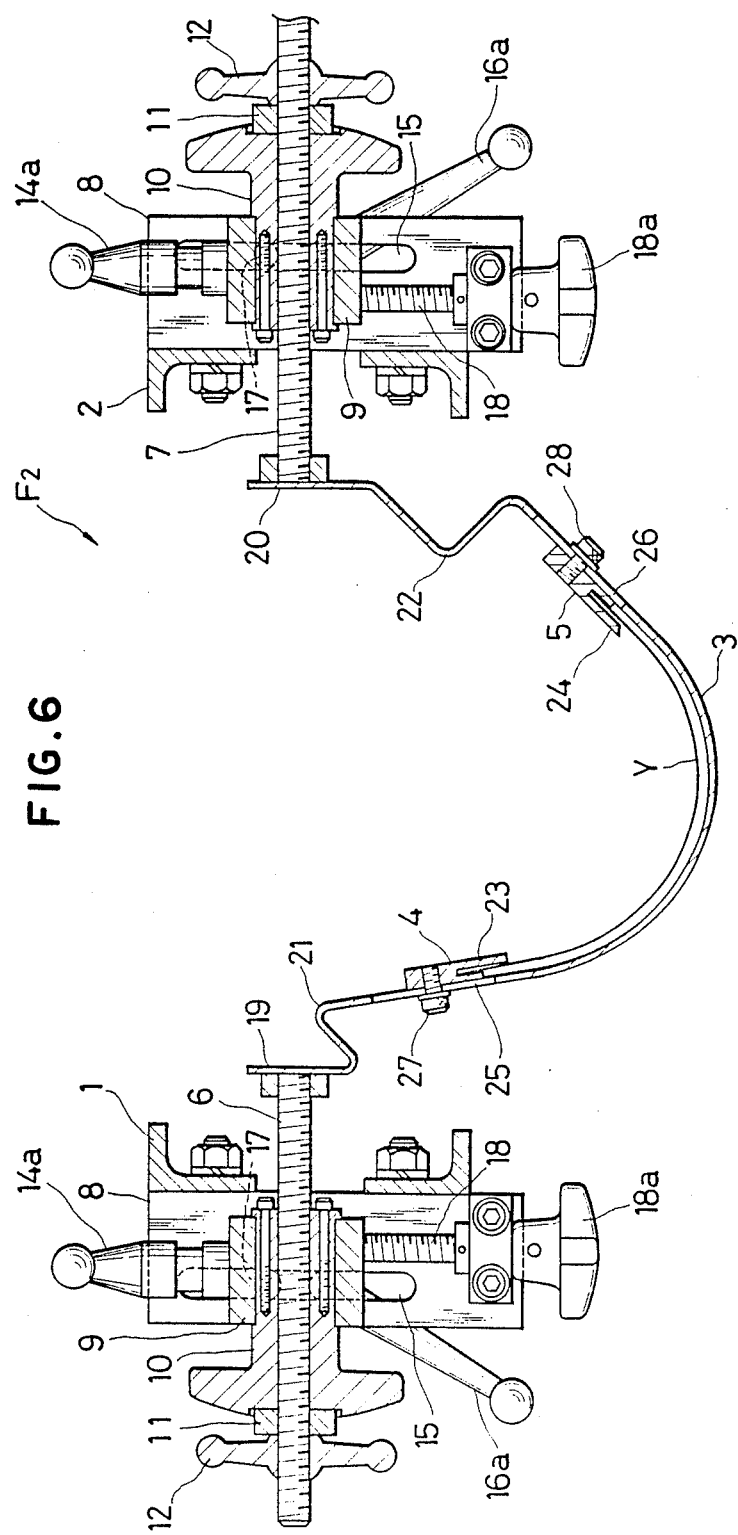
FIG. 6 is a cross-sectional view taken along line VI—VI of FIG. 5.
Figure 7:
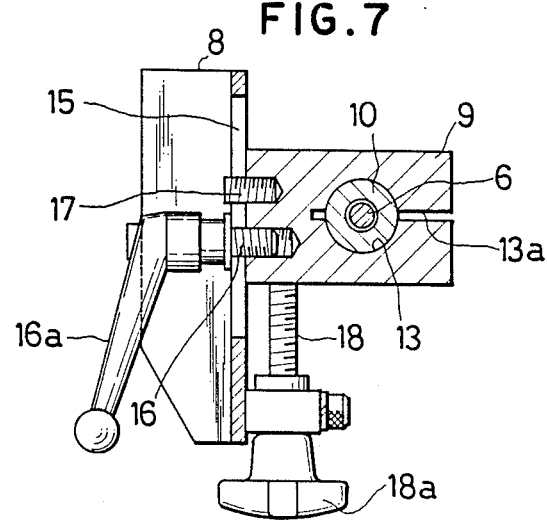
FIG. 7 is a cross-sectional view taken along line VII—VII of FIG. 5.
Figure 8:
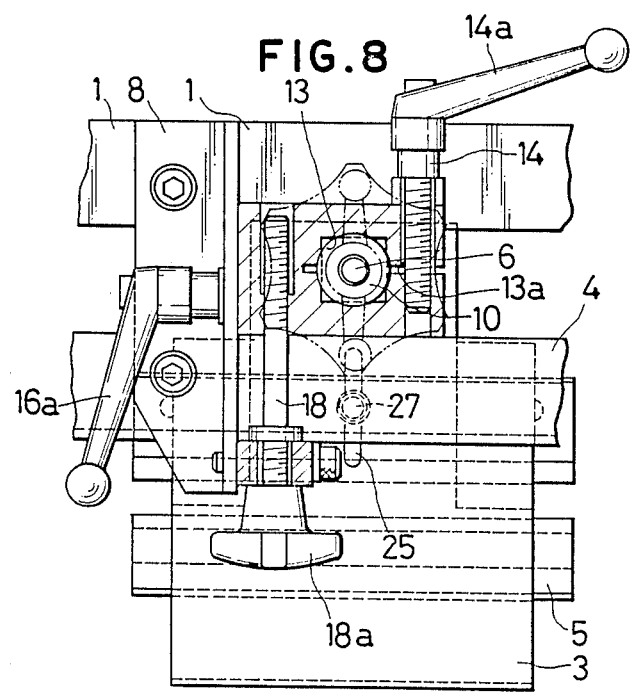
FIG. 8 is a cross-sectional view taken along line VIII—VIII of FIG. 5.

As shown in FIG. 6, the support rod 6 is inserted through a guide sleeve 10 fitted in a base block 9 vertically movably mounted on a bracket 8 attached to the base 6. A nut 11 is threaded over an externally threaded portion of the support rod 6 outwardly of the guide sleeve 10 for adjusting axial displacement of the support rod 6. The support rod 6 is fixed against axial displacement by a lock nut 12 threaded over the support rod 6 outwardly of the nut 11 and a clamping rod 14 which are threaded across a slit 13a (see FIGS. 7 and 8) defined in the base block 9 and communicating with a hole 13 through which the guide sleeve 10 extends, the clamping rod 14 being rotatable about its own axis by a handle 14a to clamp or release the support rod 6. The base block 9 is vertically movable while being guided by a clamping rod 16 and a guide pin 17 which extend through a groove 15 vertically defined in the bracket 8, as shown in FIGS. 6 and 7. As shown in FIG. 8, a vertically extending rod 18 which is rotatable about its own axis and supported on the lower end of the bracket 8 has a tip end threaded in the base block 9. The vertically extending rod 18 is rotated by a handle 18a to lift or lower the base block 9. The base block 9 is fixed against vertical movement by turning the clamping rod 16 with a handle 16a.

The support plate member 3 has its opposite ends supported on the respective support rods 6, 7 by attachment members 19, 20, respectively, and includes near its opposite ends bent portions 21, 22 extending along the direction in which the web Y is supplied, for allowing an intermediate portion of the support plate member 3 to be easily curved.

As shown in FIG. 6, the guide members 4, 5 are disposed along the opposite ends of the support plate member 3 and have respective grooves 23, 24 defined in confronting ends thereof for receiving the side edges of the web Y. As illustrated in FIGS. 5, 6, and 8, the distance between the guide members 4, 5 can be adjusted by moving these members 4, 5 toward or away from each other while loosening bolts 27, 28 inserted through respective slots 25, 26 defined in the support plate member 3.

Operation of the positioning means F2 will be described with reference to FIGS. 9 and 10.

Figure 9:
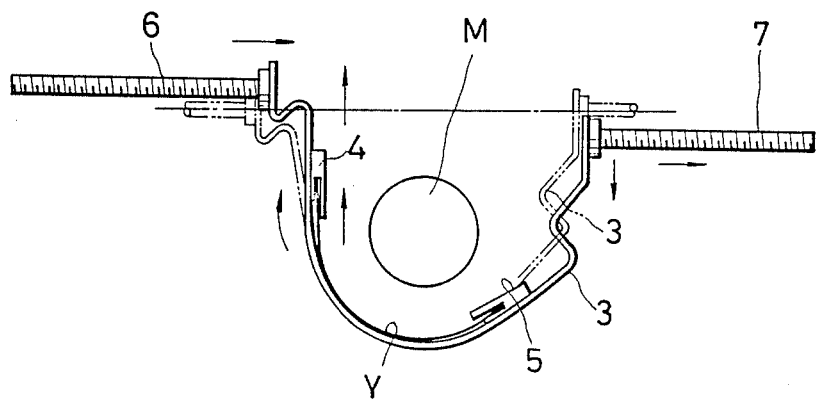
FIGS. 9 and 10 are views explaining operation of the second positioning device.

As shown in FIG. 9, the support rod 6 is moved toward the support rod 7 and also moved upwardly from the pre-adjustment position indicated by the imaginary lines to the solid-line position. The support rod 7 is moved away from the support rod 6 and also moved downwardly. Therefore, the guide members 4, 5 are turned clockwise (FIG. 9) without changing the curved shape of the support plate member 3 around a mandrel M.

Figure 10:
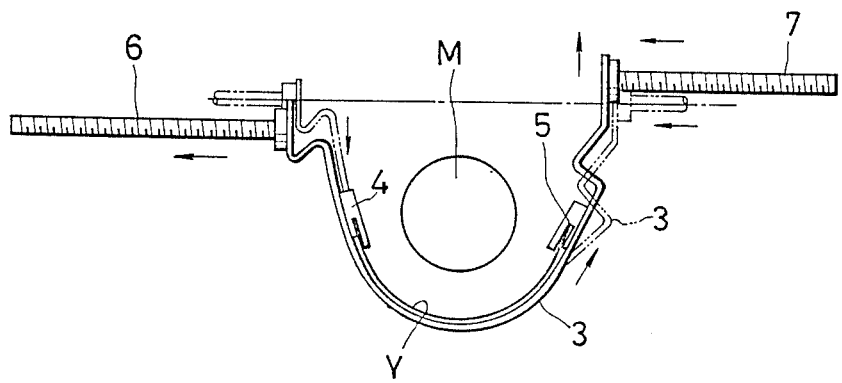

As illustrated in FIG. 10, the support rod 7 is moved toward the support rod 6 and also moved upwardly from the pre-adjustment position indicated by the imaginary lines to the solid-line position. The support rod 6 is moved away from the support rod 7 and also moved downwardly. Therefore, the guide members 4, 5 are turned counterclockwise (FIG. 10) without changing the curved shape of the support plate member 3 around the mandrel M.

The positioning means F1, F2, F3, F4 are adjusted in this manner as shown in FIG. 4 to position the web U and positionally shift or displace the webs X, Y, Z so that their side edges are vertically overlapped in a staircase configuration. The webs are also bent along the mandrel M into a tubular member. In the tubular member thus formed, the web U serves as an innermost layer shaped as a tubular body, whereas the webs X, Y, Z serve as an outer tubular body.

Figure 11:
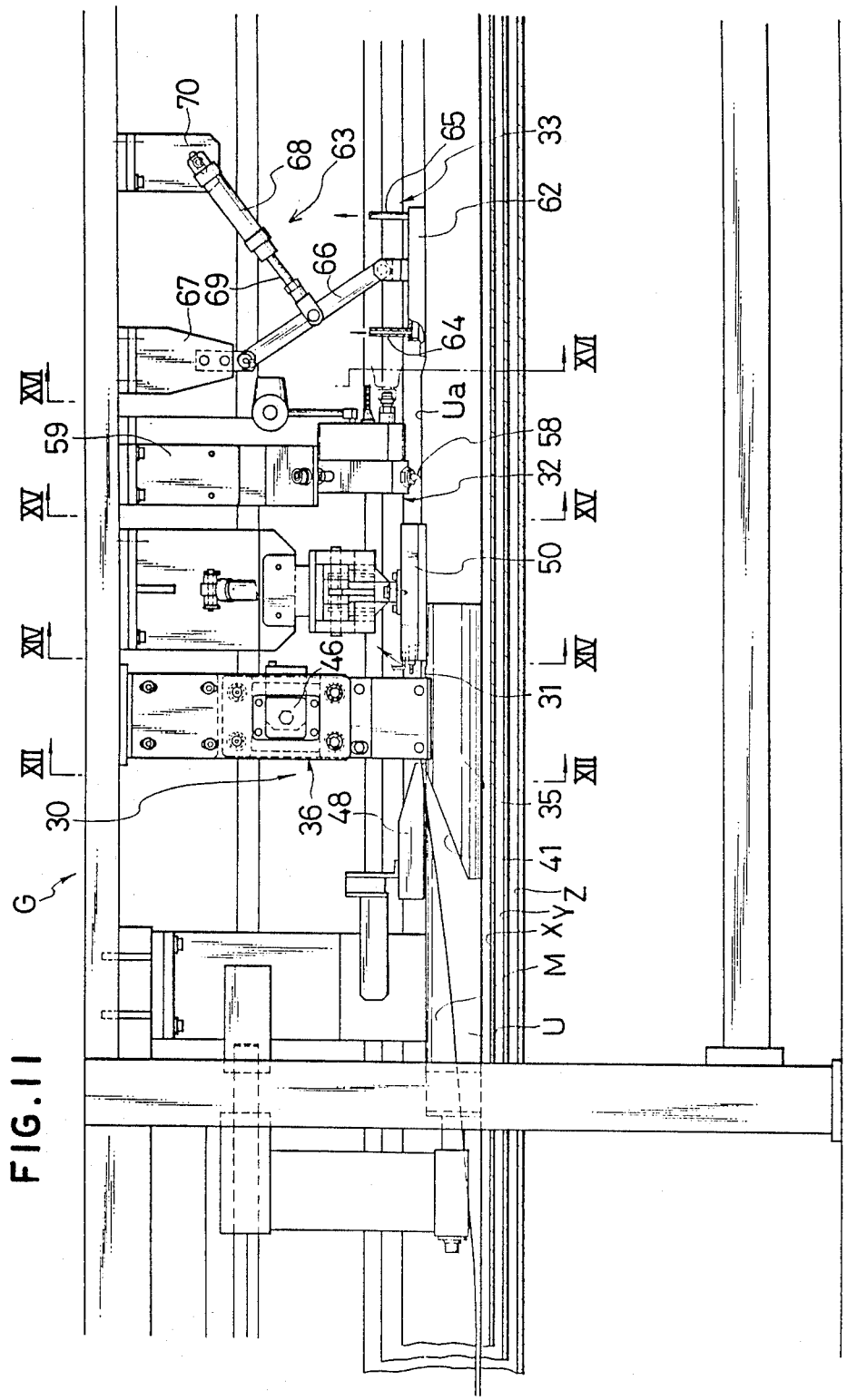
FIG. 11 is a front elevational view of a first forming device.
Figure 12:
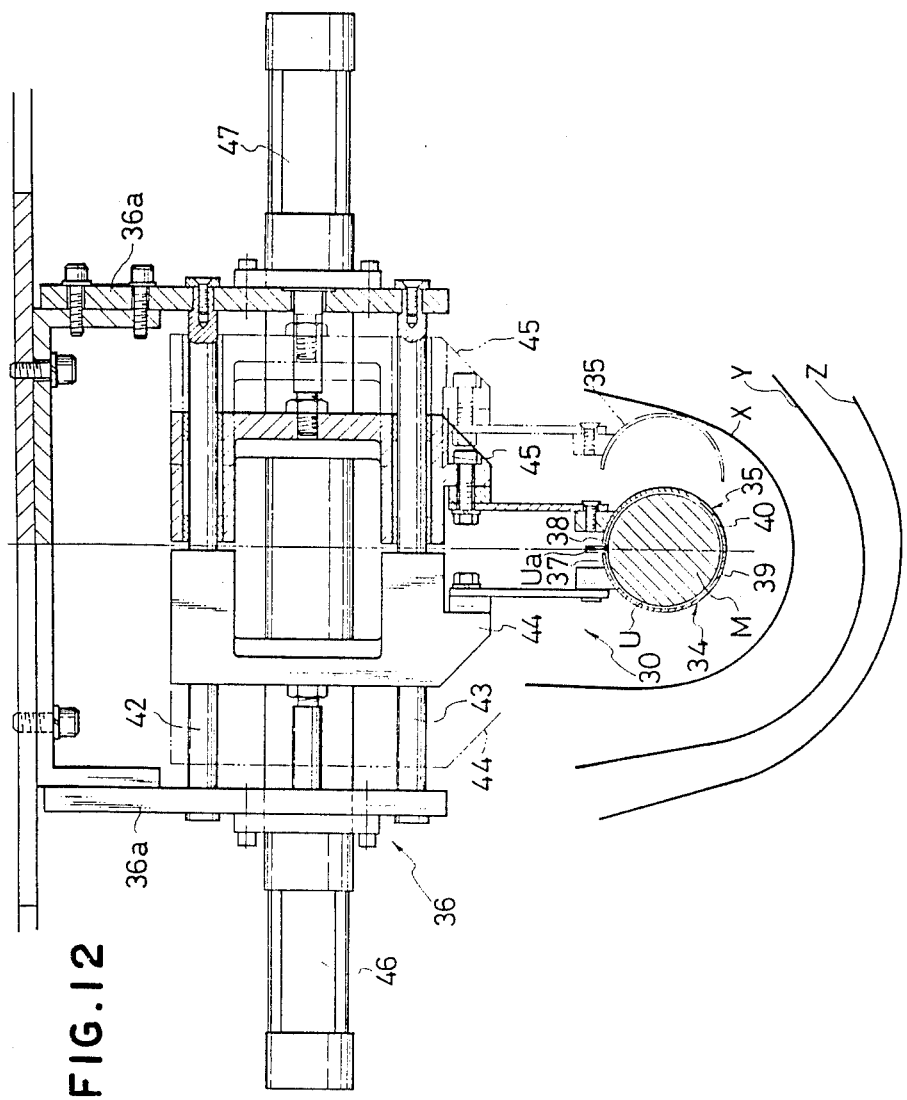
FIG. 12 is a cross-sectional view taken along line XII—XII of FIG. 11.
Figure 13:
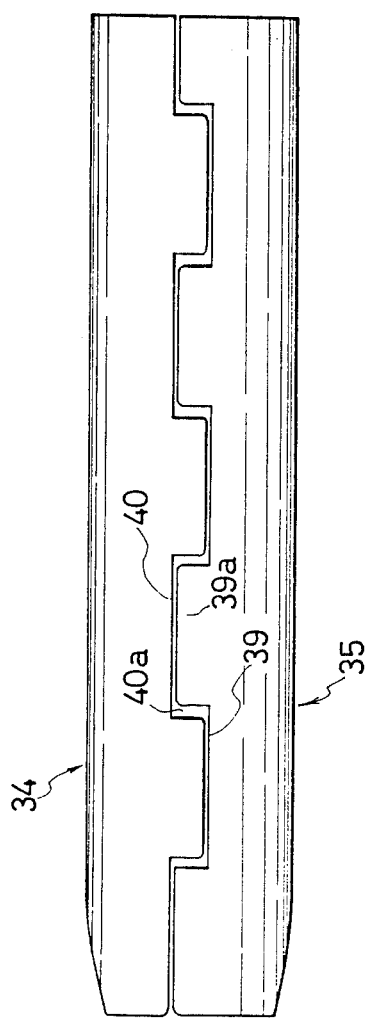
FIG. 13 is a bottom view of FIG. 12.

The first forming device G is constructed as shown in FIGS. 11 through 13. The web U or the inner layer supplied to the first forming device G is longitudinally tensioned by the withdrawing device I until it reaches the first forming device G.

The web U which is made of paper has one entire surface coated with a water-resistant synthetic resin film as a thermally fusible gas barrier.

The mandrel M extends in the longitudinal direction in which the web U is continuously supplied, and is disposed intermediate between the opposite side edges of the web U in confronting relation to the thermally fusible film. The web U is shaped into a tubular form by a shaping/guiding device 30. The opposite side edges of the web U which are brought into abutting relation to each other by the shaping/guiding device 30 are joined to each other by a fusing device 31. The opposite side edges of the web U which are thus joined to each other by the fusing device 31 are coated with a hot-melt adhesive by an adhesive coating device 32. The opposite side edges of the web U are pressed and bonded by a pressing device 33 while the coated surfaces are being directed inwardly and the web U is being bent into a tubular form.

The mandrel M has a circular cross-sectional shape and its outer circumferential dimension is shorter than the width between the opposite side edges of the web U.

As shown in FIGS. 11 and 12, the shaping/guiding device 30 has a pair of semicylindrical shaping/guiding members 34, 35 and an opening/closing means 36 for enabling the shaping/guiding members 34, 35 to embrace the mandrel M on its diametrically opposite sides. The opening/closing means 36 is supported on a pair of laterally spaced support members 36a suspended from a frame.

The shaping/guiding members 34, 35 have respective upper edges 37, 38 facing each other and respective lower edges 39, 40 facing each other. The upper edges 37, 38 are spaced from each other by a gap between which the opposite side edges Ua of the web U as it is shaped along the mandrel M project upwardly. As shown in FIG. 13, the lower edges 39, 40 of the shaping/guiding members 34, 35 are in the shape of intermeshing teeth and grooves 39a, 40a for preventing the web U from entering between the lower edges 39, 40 when the web U is supplied between the shaping/guiding members 34, 35 and the mandrel M.

The web U is guided to run along the mandrel M by guide edges 41 of the shaping/guiding members 34, 35.

As illustrated in FIG. 12, the opening/closing means 36 includes a pair of parallel guide rods 42, 43 mounted on the support members 36a and a pair of cylinders 46, 47 mounted on the support members 36a for moving support members 44, 45 of the shaping/guiding members 34, 35 toward and away from each other on and along the guide rods 42, 43.

The opposite side edges Ua of the web U are guided into the gap between the upper edges 37, 38 of the shaping/guiding members 34, 35 by means of a guide plate 48.

Figure 14:
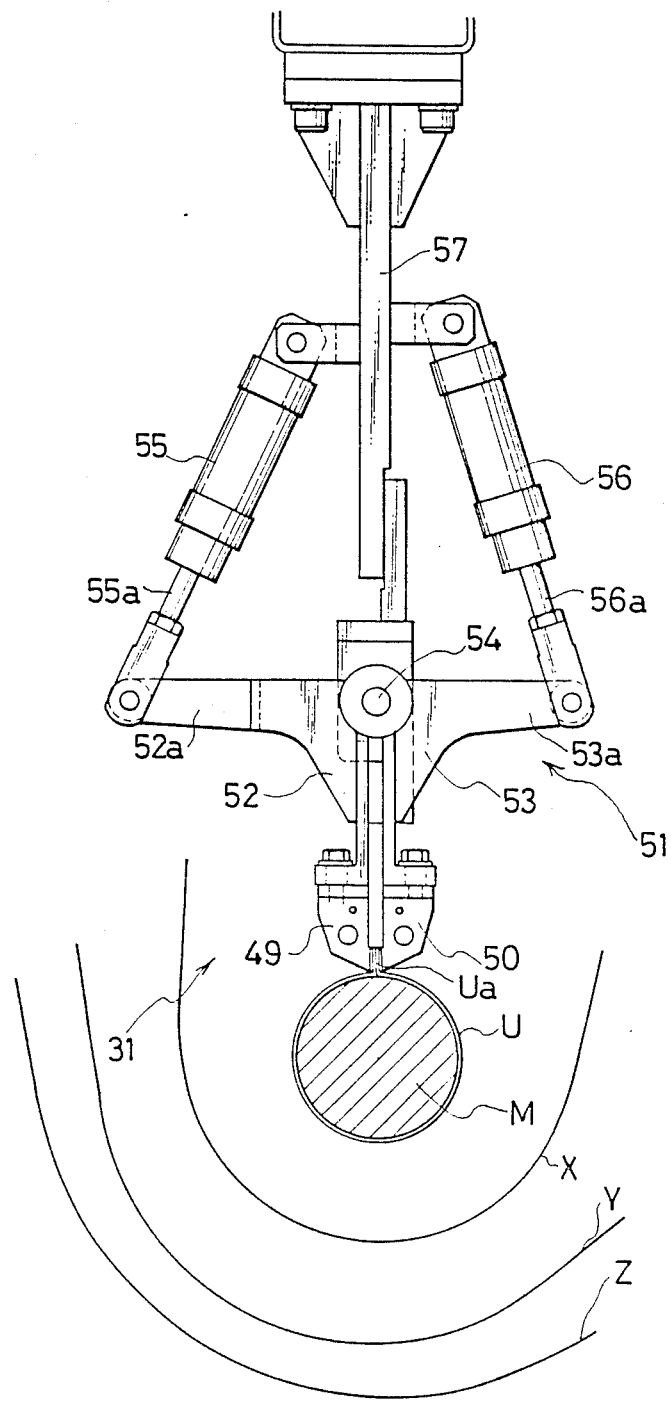
FIG. 14 is a cross-sectional view taken along line XIV—XIV of FIG. 11.

As shown in FIGS. 11 and 14, the fusing device 31 has a pair of heaters 49, 50 disposed in facing relation to the position where the opposite side edges Ua of the web U which are mated by the shaping/forming device 30 pass, and a means 51 for opening and closing the heaters 49, 50.

In FIG. 14, the means 51 has a pair of L-shaped support members 52, 53 including confronting vertical portions. The heaters 49, 50 are mounted on lower ends, respectively, of the vertical portions of the support members 52, 53. The L-shaped support members 52, 53 have bent portions pivotally coupled to a common shaft 54 and horizontal portions 52a, 53a connected to piston rods 55a, 56a, respectively, of a pair of cylinders 55, 56. Thus, the heaters 49, 50 can be moved toward and away from each other (i.e., closed and opened) by the cylinders 55, 56. The cylinders 55, 56 have rear ends swingably mounted on a support member 57 by which the shaft 54 is suspended from the frame. The horizontal portion 52a of the support member 52 is longer than the horizontal portion 53a of the support member 53 so that the heater 50 will be closed with respect to the heater 49, the closed position of which is used as a reference.

Figure 15:
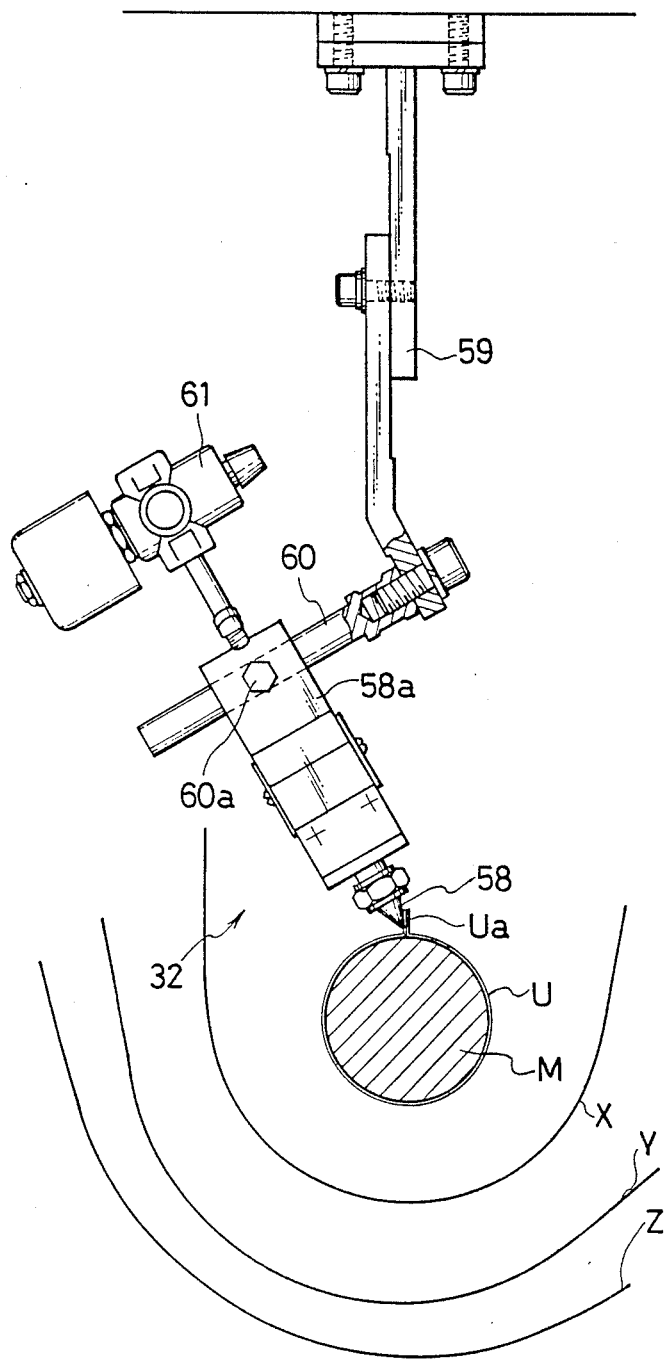
FIG. 15 is a cross-sectional view taken along line XV—XV of FIG. 11.

As illustrated in FIGS. 11 and 15, the adhesive coating device 32 comprises an ejector nozzle 58 for applying a hot-melt adhesive to one outer side of the opposite side edges Ua of the web U which are fused by the fusing device 31. The nozzle 58 has a base portion 58a positionally adjustably attached by a bolt 60a to a guide rod 60 coupled to a support member 59 suspended from the frame. The hot-melt adhesive is supplied through a pipe (not shown) which is associated with a regulator valve 61.

Figure 16:
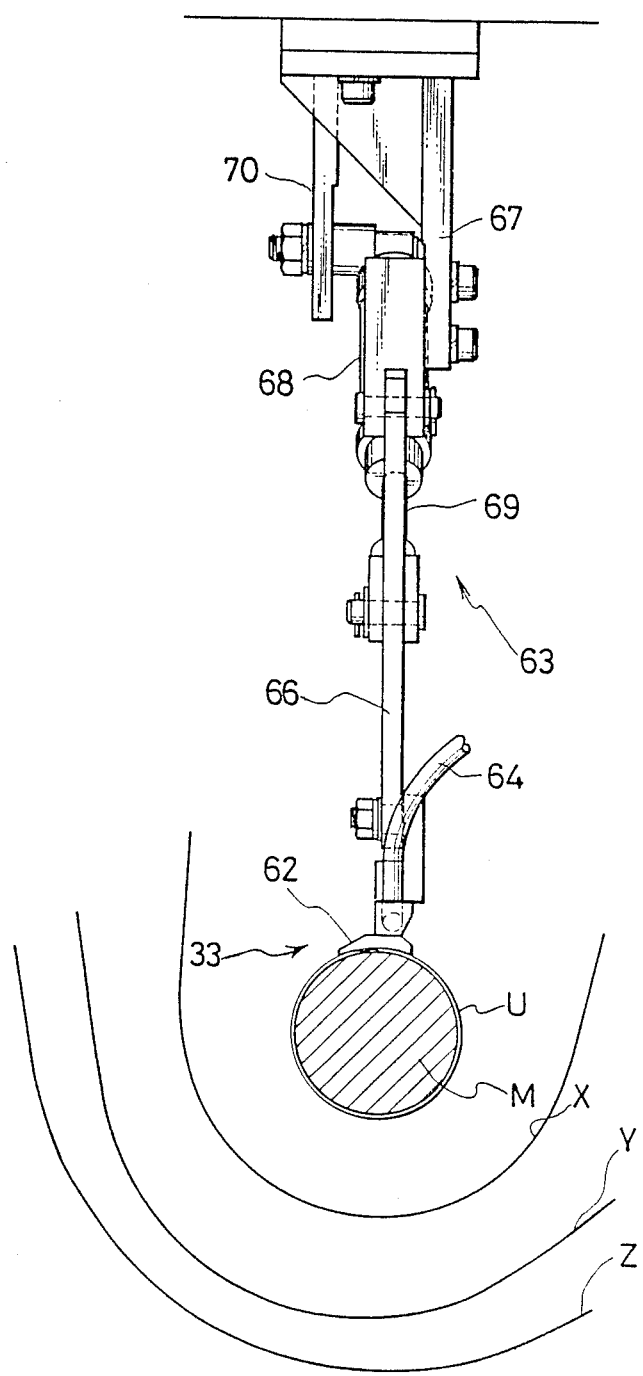
FIG. 16 is a cross-sectional view taken along line XVI—XVI of FIG. 11.

As shown in FIGS. 11 and 16, the pressing device 33 comprises a pressing means 62 vertically movable into and out of the position where the opposite side edges Ua of the web U coated with the adhesive by the adhesive coating device 32 pass, and a means 63 for vertically moving the pressing means 62.

The pressing means 62 has a bottom surface curved along a portion of the outer circumferential surface of the mandrel M, and includes a pipe extending over its entire length for promoting the solidification of the adhesive A coolant is supplied to the pipe and flows therethrough via tubes 64, 65 coupled to the pipe.

The means 63 for vertically moving the pressing means 62 has a link 66 swingably coupled at one end to a longitudinally central portion of the pressing means 62 and at the other end to a support member 67 suspended from the frame. The link 66 has an intermediate portion connected to a piston rod 69 of a cylinder 63 that has a rear end pivotally coupled to a support member 70 suspended from the frame. Since the pressing means 62 is swingably supported on the frame, no problem arises even when the opposite side edges of the bent web U have wrinkles or surface irregularities.

The first forming device G will operate as follows:

As described above, while the innermost layer or web U is being withdrawn by the withdrawing device I, it is longitudinally tensioned thereby and continuously supplied along the mandrel M.

When the shaping/guiding members 34, 35 of the shaping/guiding device 30 are brought into a closed position while embracing the web U by means of the opening/closing means 36, as shown in FIG. 11, the web U is guided by the guide edges 41 of the shaping/guiding members 34, 35 into a shape complementary to and along the mandrel M. At the same time, as shown in FIG. 12, the opposite side edges of the web U are inserted into the gap between the upper edges 37, 38 of the shaping/guiding members 34, 35 and mated together in abutment while they are projecting upwardly.

The abutting side edges Ua of the web U then pass through the gap between the heaters 49, 50 (FIG. 14) which are closed by the opening/closing means 51, whereupon the thermally fusible film layers on the inner surfaces of the side edges Ua are fused and joined together.

As shown in FIG. 15, one side of the joined side edges Ua is coated with an adhesive by the adhesive coating device 32.

Then, as shown in FIG. 16, the joined side edges Ua are bent by the pressing means 62 lowered by the means 63 so that the adhesive-coated side is directed downwardly toward the mandrel M, until the joined side edges Ua are bonded to the outer surface of the tubular body.

Thereafter, the webs X, Y, Z are bent along the mandrel M by the second forming device H to form a tubular body which is disposed around the tubular body formed from the web U.

Figure 17:
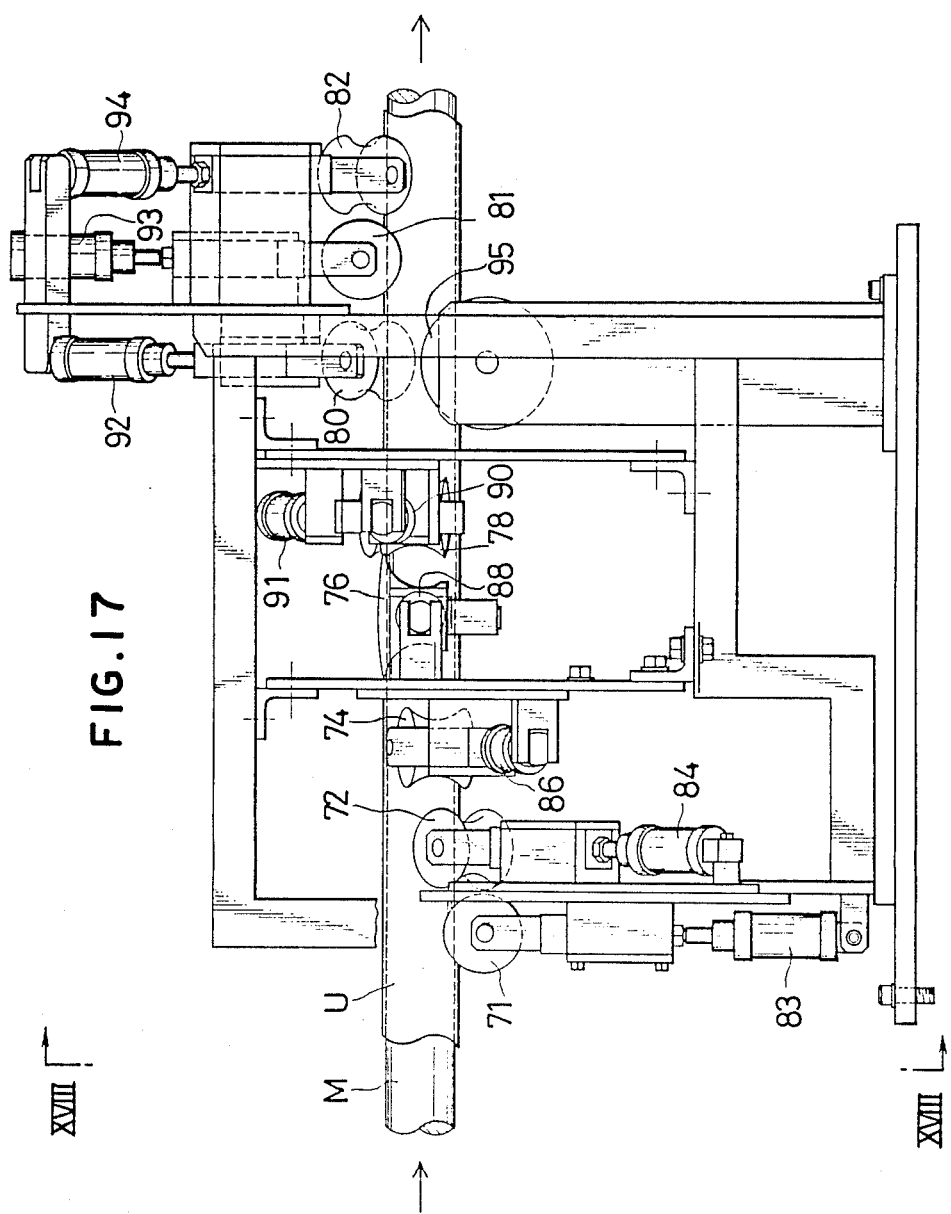
FIG. 17 is a front elevational view of a second forming device.
Figure 18:
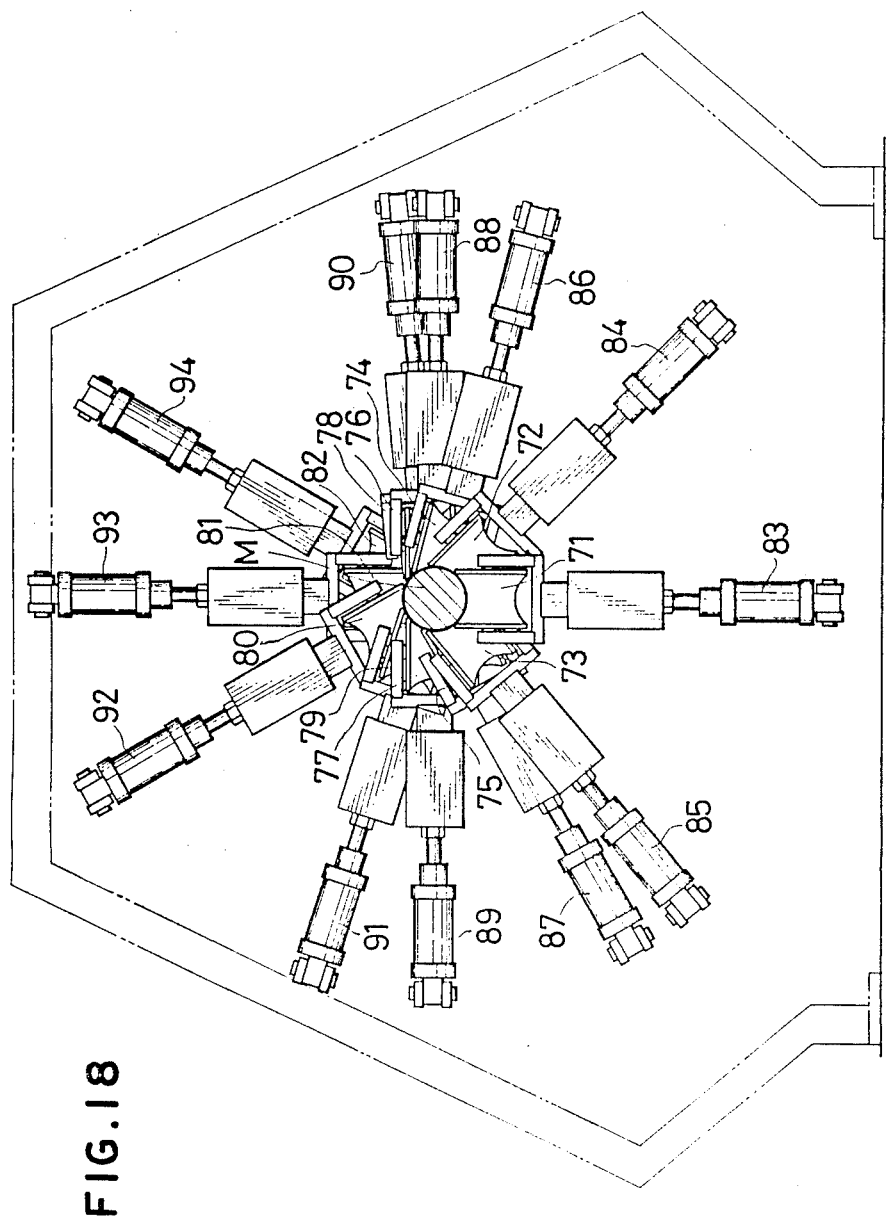
FIG. 18 is a cross-sectional view taken along line XVIII—XVIII of FIG. 17.

The second forming device H is illustrated in FIGS. 17 and 18.

The second forming device H has the mandrel M which serves to guide the tubular body formed from the web U and positioned inwardly of the webs X, Y, Z (not shown in FIGS. 17 and 18) that are continuously fed along. The mandrel M extends longitudinally of the webs X, Y, Z to the withdrawing device I and the cutting device J.

Around the mandrel M, there are disposed a plurality of rollers 71 through 82 for bending the webs X, Y, Z along the outer peripheral surface of the mandrel M into the tubular body, the rollers 71 through 82 being positionally displaced in the direction in which the webs X, Y, Z advance. Each of the rollers 71 through 82 has an arcuate concave surface complementary to a circumferential portion of the outer surface of the mandrel M, and has its axis of rotation normal to the axis of the mandrel M.

As shown in FIGS. 18 and 19, the rollers 71 through 82 are arranged as follows: The roller 71 which first presses the webs X, Y, Z against the mandrel M is positioned at an intermediate portion between the opposite side edges of the web X. The rollers 72, 73 located downstream of the roller 71 in the direction of travel of the webs X, Y, Z are angularly displaced from the roller 71 in opposite circumferential directions of the mandrel M such that the arcuate pressing surfaces of the rollers 72, 73 overlap the arcuate pressing surface of the roller 71 about the mandrel M. The rollers 74, 75 disposed downstream of the rollers 72, 73 are also angularly shifted such that the arcuate pressing surfaces of the rollers 74, 72 overlap each other about the mandrel M whereas the arcuate pressing surfaces of the rollers 75, 73 overlap each other about the mandrel M. The rollers 76, 77 disposed downstream of the rollers 74, 75 are also angularly shifted such that the arcuate pressing surfaces of the rollers 76, 74 overlap each other about the mandrel M whereas the arcuate pressing surfaces of the rollers 77, 75 overlap each other about the mandrel M. The other rollers 78 through 82 are similarly positioned. Therefore, the arcuate pressing surfaces of the rollers 71 through 82 cover the entire circumferential surface of the mandrel M in overlapping relation.

The rollers 71 through 82 are connected to respective cylinders 83 through 94 which serve to press the centers of the arcuate pressing surfaces of the rollers toward the mandrel M. The tubular body formed by the second forming device H is supported and guided by a support roller 95 (FIG. 17).

The rollers 71 through 82 can apply forces tending to press the webs X, Y, Z against the mandrel M, the forces being applied continuously in linear directions from the roller 71 circumferentially of the mandrel M.

The process of forming the tubular body will be described below with reference to FIGS. 19(a) through 19(h).

Figure 19C:
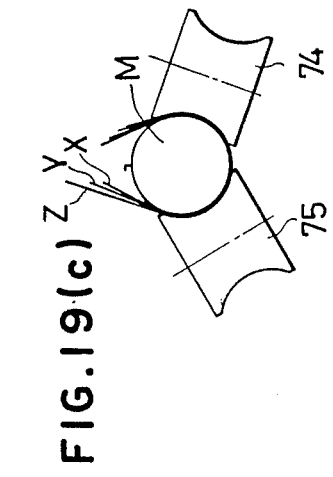
FIGS. 19(a) through 19(h) are views explanatory of operation of the second forming device.
Figure 19F:
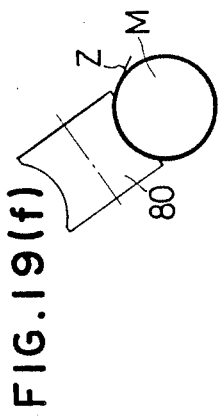
Figure 19H:
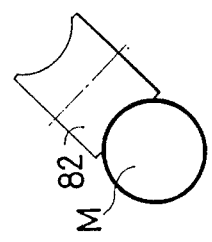
Figure 19B:
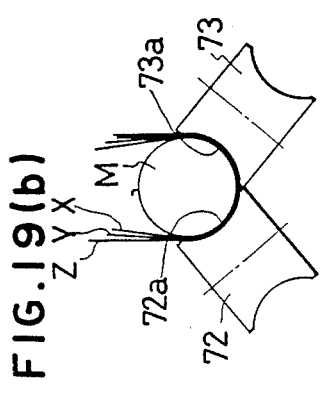
Figure 19E:
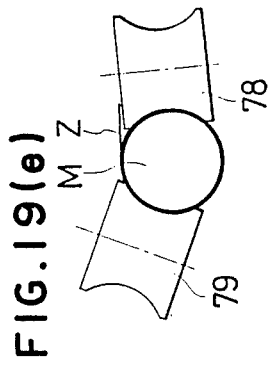
Figure 19G:
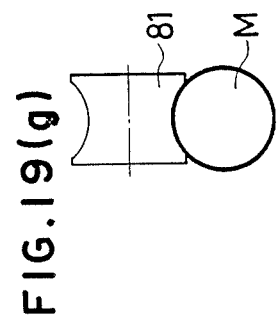
Figure 19A:
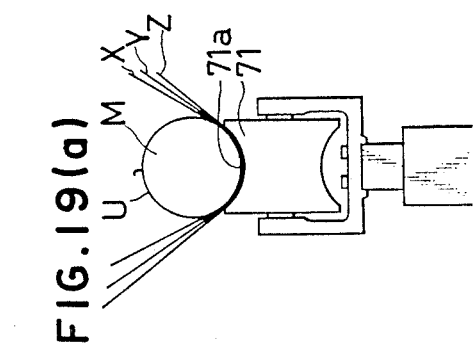

As illustrated in FIG. 19(a), the webs X, Y, Z are pressed against the mandrel M by the roller 71 and bonded together in overlapping relation by intervening hot-melt adhesive layers. At this time, the pressing force applied is maximum at a central area 71a of the arcuate pressing surface of the roller 71, and becomes progressively smaller toward the side edges of the arcuate pressing surface of the roller 71. Therefore, the webs X, Y, Z are firmly bonded together at the central area 71a, and bonded progressively less sufficiently toward the side edges of the arcuate pressing surface of the roller 71.

Figure 19D:
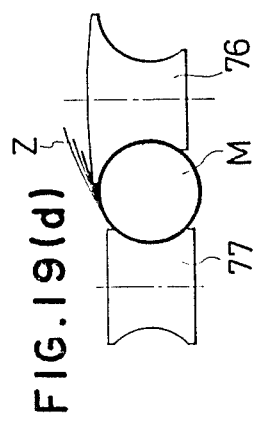

Then, as shown in FIG. 19(b), while the webs X, Y, Z are being spaced from each other except for their portions bonded by the roller 71, the webs X, Y, Z are pressed by the rollers 72, 73 so as to be bonded in a greater region. Since central areas 72a, 73a of the pressing surfaces of the rollers 72, 73 are positionally displaced from each other in the opposite circumferential directions of the mandrel M, those regions of the webs X, Y, Z which have not sufficiently been bonded by the roller 71 are completely bonded by the rollers 72, 73, resulting in a much larger bonded region. Likewise, as shown in FIGS. 19(c) through 19(e), the pressing forces are circumferentially shifted toward the opposite side edges of the webs X, Y, Z by the rollers 74 through 79 to bend the webs X, Y, Z into a shape complementary to the outer circumferential shape of the mandrel M.

At this time, one side edge of each of the webs X, Y, Z is bent by the roller 78 so that it abuts against the mandrel M earlier than the other side edge thereof. Thereafter, as illustrated in FIGS. 19(f) through 19(h), the other side edges of the webs X, Y, Z are bonded in overlapping relation to form a completely bonded tubular member.

Figure 20:
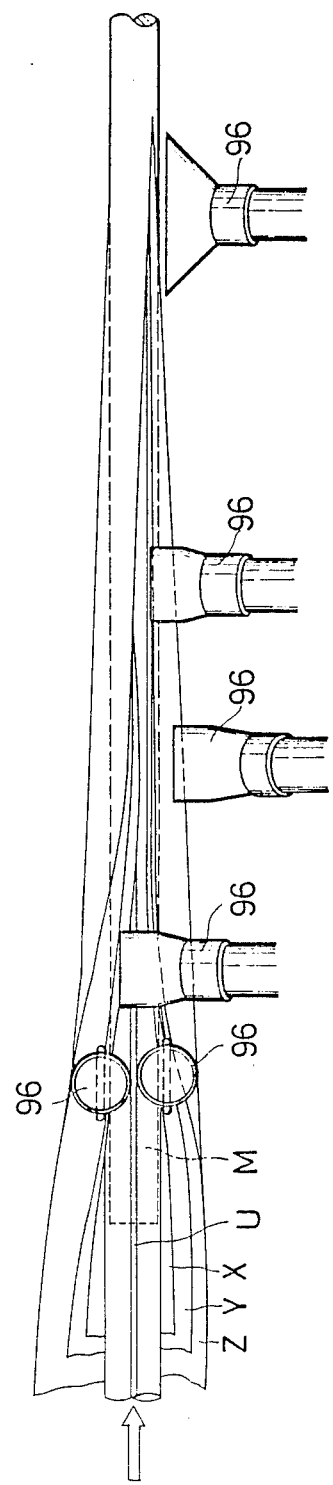
FIG. 20 is a plan view of a heating device associated with the second forming device.
Figure 21C:
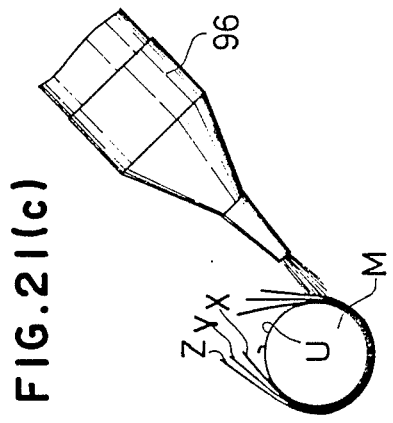
FIGS. 21(a) through 21(e) are views explaining a process of heating a hot-melt adhesive with the heating device.
Figure 21E:
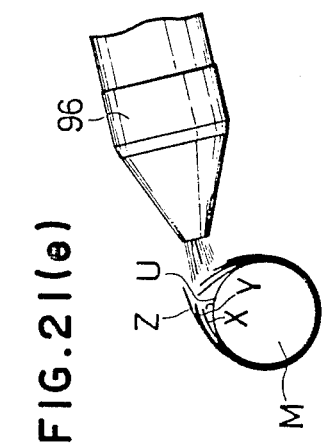
Figure 21B:
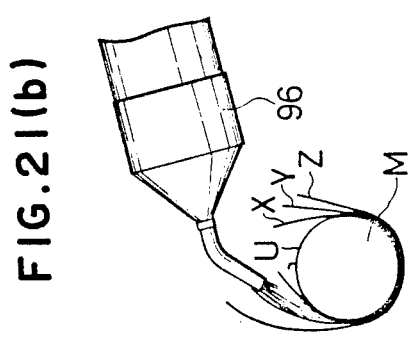
Figure 21D:
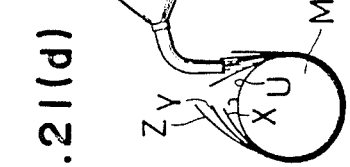
Figure 21A:
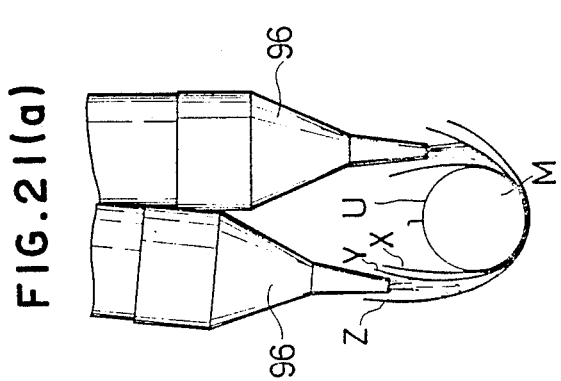

FIG. 20 shows a heating device associated with the second forming device H. The heating device has nozzles 96 housing heaters therein for ejecting heated air into the spaces between the webs X, Y, Z to keep the hot-melt adhesive layers coated on the webs X, Y, Z in a melted condition. As shown in FIGS. 21(a) through 21(e), the plural nozzles 96 are provided for keeping the hot-melt adhesive reliably melted immediately before the webs X, Y, Z bent by the second forming device H are bonded by the hot-melt adhesive.

The withdrawing device I is illustrated in detail in FIGS. 22 through 25.

Figure 24:
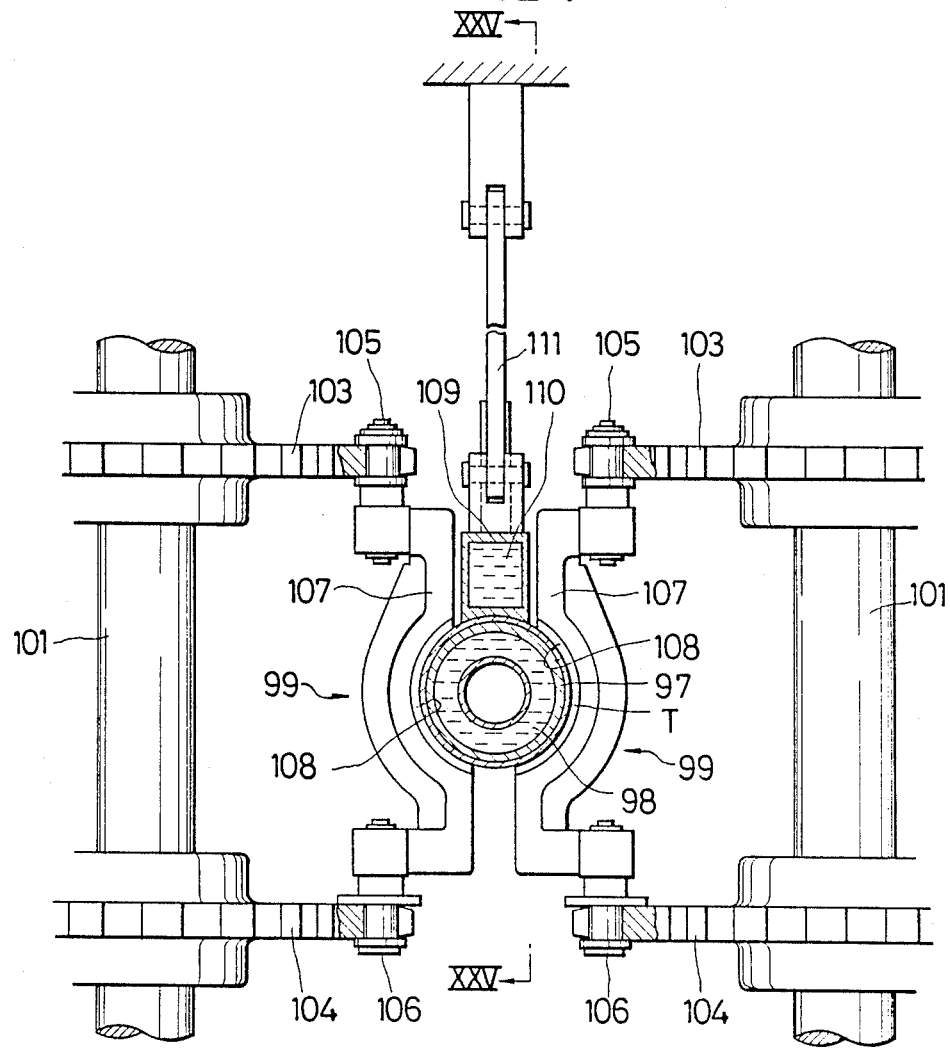
FIG. 24 is a cross-sectional view taken along line XXIV—XXIV of FIG. 22.
Figure 25:
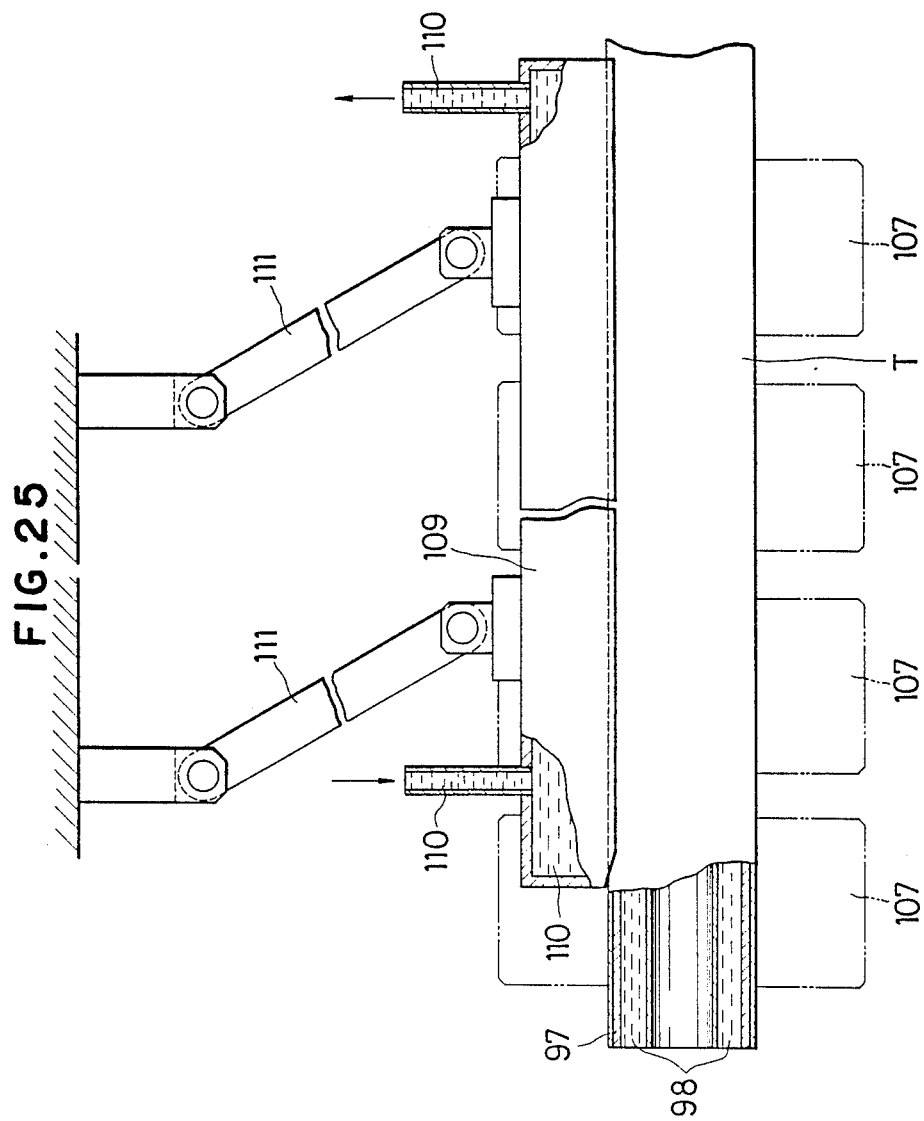
FIG. 25 is a cross-sectional view taken along line XXV—XXV of FIG. 22.
Figure 26:
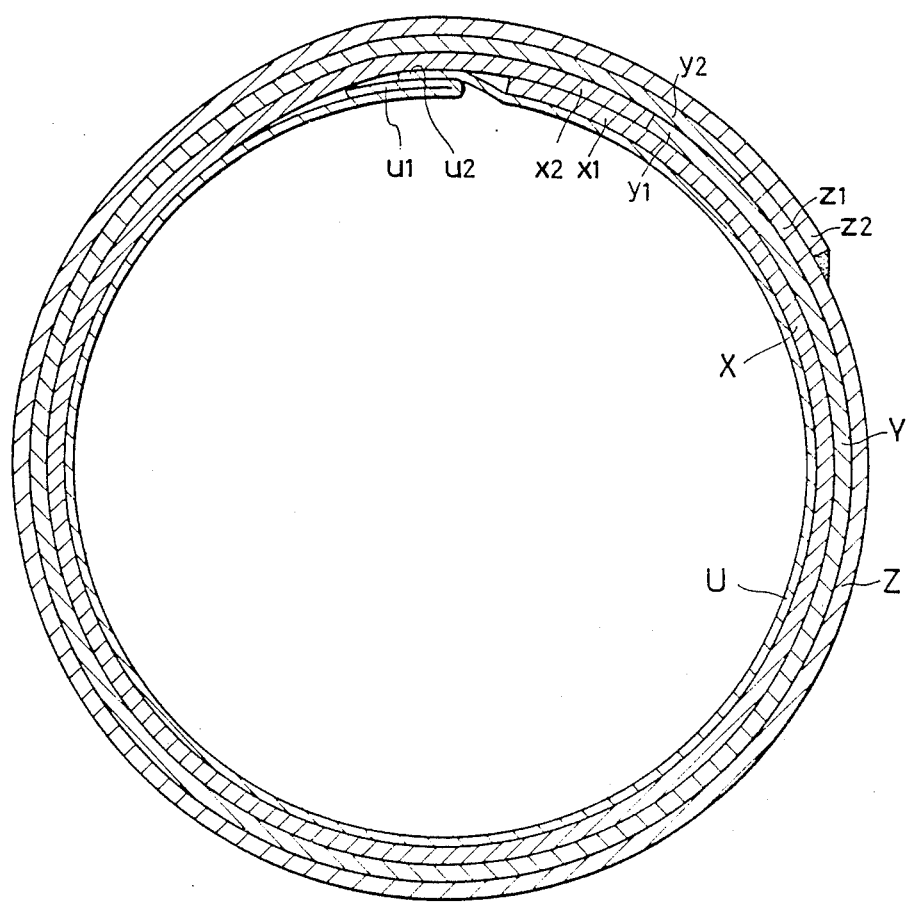
FIG. 26 is a cross-sectional view of a tubular member formed by the apparatus of the present invention.

The tubular member, designated at T, which is formed coaxially with the mandrel M is withdrawn from the second forming device H by the withdrawing device I while it is being fitted over and guided by a cooling mandrel 97 extending through the withdrawing device I. Cooling water 98 is supplied so as to circulate in the cooling mandrel 97 throughout its entire length, as shown in FIGS. 24 and 25. The tubular member T has a joined portion or seam Ta positioned along an upper edge of the cooling mandrel 97.

The withdrawing device I has a pair of endless feeding/gripping means 99 disposed in confronting relation to each other along the cooling mandrel 97 for gripping the tubular member T between the feeding/gripping means 99 and the cooling mandrel 97 and for withdrawing the tubular member T. Each of the feeding/gripping means 99 comprises a driver shaft 101 and a driven shaft 102 which are vertically disposed at front and rear positions on support frames 100 arranged along the cooling mandrel 97. Each of the shafts 101, 102 supports first and second gears 103, 104 on its upper and lower portions, and endless chains 105, 106 are trained around the first gears 103 and the second gears 104. A number of gripping members 107 are vertically disposed on and between the chains 105, 106 for engaging the surface of the tubular member T fitted over the cooling mandrel 97. As shown in FIG. 24, paired gripping members 107 have respective gripping surfaces 108 curved for gripping confronting peripheral surfaces of the tubular member T fitted over the cooling mandrel 97, the paired gripping members 107 being spaced from each other at positions along opposite sides of the tubular member T.

A cooling body 109 is disposed in a gap or space defined between the gripping members 107 of the gripping means 99, the cooling body 109 extending along the upper edge of the cooling mandrel 97. The cooling body 109 is supplied with circulating cooling water 110 as shown in FIG. 25. The cooling body 109 can be lowered by a pair of links 111 so as to be seated on the tubular member T fitted over the cooling mandrel 97, in an area around the joined portion Ta of the tubular member T.

During operation of the withdrawing device I, the tubular member T formed from the webs X, Y, Z with their side edges joined by the second forming device H is withdrawn along the cooling mandrel 97 while being gripped by the gripping means 99 in the withdrawing device I. At this time, the tubular member T is cooled from its inner surface by the cooling mandrel 97 over which the tubular member T is fitted. Simultaneously, the joined portion Ta is cooled from its outer surface by the cooling body 109 to complete the solidification of the hot-melt adhesive in the joined portion Ta.

Although a certain preferred embodiment has been shown and described, it should be understood that many changes and modifications may be made therein without departing from the scope of the appended claims.

What is claimed is:

1. An apparatus for manufacturing a tubular member by continuously supplying a plurality of elongate flexible webs while positionally displacing the webs in overlapping relation with side edges thereof arranged in a staircase configuration, progressively bending the webs along a mandrel, bonding the webs with adhesive layers interposed therebetween to form a tubular member, and joining the displaced side edges to complete the tubular member, said apparatus comprising: a device for continuously supplying the webs in mutually spaced-apart relation while longitudinally tensioning the webs; a plurality of resilient support plate members disposed respectively for the webs and arranged to lie along the lower surfaces of the webs transversely thereof, said support plate members having opposite ends positioned adjacent opposite side edges of the webs; a mandrel; devices supporting said opposite ends of the support plate members for moving said opposite ends vertically and toward and away from each other, said devices being capable of moving said opposite ends of the support plate members toward each other to curve the support plate members about an outer peripheral surface of said mandrel; and a positioning arrangement having a pair of guide members mounted on an inner surface of each of said support plate members for engaging opposite side edges of one of the webs.

2. An apparatus for manufacturing a tubular member by continuously supplying a plurality of elongate flexible webs while positionally displacing the webs in overlapping relation with side edges thereof arranged in a staircase configuration, progressively bending the webs along a mandrel, bonding the webs with adhesive layers interposed therebetween to form a tubular member, and joining the displaced side edges t complete the tubular member, said apparatus comprising: a device for continuously supplying an innermost one of said elongate webs having a thermally fusible layer on a surface thereof facing the mandrel, while longitudinally tensioning said innermost web; a mandrel disposed to lie at an intermediate position between opposite side edges of said innermost web and having an outer circumferential dimension shorter than the distance between the opposite side edges of said innermost web; a shaping/guiding device having a pair of semicylindrical shaping/guiding members for bending said innermost web along said mandrel into a tubular body, said shaping/guiding members being movable toward and away from said mandrel and having lower edges disposed in confronting relation to each other at an intermediate position between the opposite side edges of said innermost web and upper edges disposed in confronting relation to each other for receiving between them the opposite side edges of said innermost web; a fusing device for pressing with heat the opposite edges of said innermost web which project between said upper edges of the shaping/guiding members to fuse the confronting thermally fusible layers to join the opposite side edges; an adhesive coating device for coating a hot-melt adhesive to an outer surface of the joining opposite side edges; and a pressing device for pressing the outer surface coated with the hot-melt adhesive against an outer surface of the tubular body.

3. An apparatus for manufacturing a tubular member by continuously supplying a plurality of elongate flexible webs while positioning displacing the webs in overlapping relation with side edges thereof arranged in a staircase configuration, progressively bending the webs along a mandrel, bonding the webs with adhesive layers interposed therebetween to form a tubular member, and joining the displaced side edges to complete the tubular member, said apparatus comprising: a device for supplying the elongate webs in mutually spaced-apart relation while longitudinally tensioning the webs, each of the webs having a hot-melt adhesive applied on at least one surface thereof; a mandrel disposed to lie at an intermediate position between opposite side edges of an innermost one of said webs and extend along the webs; a device having a plurality of rollers each having a pressing surface complementary to a portion of an outer circumferential surface of the mandrel for pressing the webs against the mandrel, said rollers being positionally displaced from each other longitudinally of said mandrel and angularly about the axis of said mandrel with longitudinally successive rollers having their pressing surfaces partly overlapped circumferentially about said mandrel for progressively enlarging the bonded area between the webs; and a device for heating the hot-melt adhesive after the application thereof to said webs to keep the same in a melted condition at least until the webs reach said rollers.

4. An apparatus according to claim 3, wherein said mandrel has a circular or elliptical cross section, said pressing surface of each of said rollers being of an arcuate shape extending along the outer circumferential surface of said mandrel, said rollers having axes of rotation normal to an axis of said mandrel, the arrangement being such that the rollers press said webs against said mandrel at central positions of the arcuate pressing surfaces of the rollers.

5. An apparatus according to claim 3, wherein said mandrel and one of said rollers which first presses the webs against said mandrel are positioned in confronting relation to an intermediate position between the opposite side edges of an innermost one of said webs.

6. An apparatus for manufacturing a tubular member by continuously supplying a plurality of elongate flexible webs while positionally displacing the webs in overlapping relation with side edges thereof arranged in a staircase configuration, progressively bending the webs along a mandrel, bonding the webs with a hot-melt adhesive applied to the webs to form a tubular member, and joining the displaced side edges to form a joined area and complete the tubular member, said apparatus comprising: means for heating said hot-melt adhesive after it has been applied to said webs for keeping the same in a melted state; and a cooling mandrel for guiding the completed tubular member fitted thereover; a withdrawing device for withdrawing the tubular member along said cooling mandrel; and a cooling body disposed in a position confronting the joined portion of the passing tubular member, for abutting against the joined against the joined portion of the tubular member.

7. A method for manufacturing a tubular member comprising the following steps;
continuously supplying a plurality of elongated flexible webs in a mutually spaced-apart relationship while longitudinally tensioning the webs;
positionally displacing the webs in overlapping relationship until the side edges thereof are arranged in a staircase configuration;
transversely supporting the webs along the lower surfaces thereof by means which enables moving opposite side edges of the webs vertically and toward and away from each other while maintaining the spaced-apart relationship of the webs to progressively bend the supported webs about an outer peripheral surface of a mandrel;
bonding the webs with adhesive layers interposed between the webs to form the tubular member; and
joining the displaced side edges to complete the tubular member.

8. A method for manufacturing a tubular member comprising the following steps:
continuously feeding a U-shaped web having a water-resistant gas barrier surface and a plurality of paper webs in a mutually spaced-apart relationship, while longitudinally tensioning the webs;
heating the paper webs so that they are uniformly dried;
positionally displacing the webs in overlapping relationship until the side edges thereof are arranged in a staircase configuration;
coating the mutually confronting surfaces of the webs with a hot-melt adhesive;
heating the hot-melt adhesive coating webs to maintain the adhesive in a melted condition;
further positioning the webs for accurately positioning the side edges of the webs;
bending the U-shaped web along a mandrel to form an innermost tubular member;
bending the plurality of paper webs along said mandrel to form with said U-shaped web a composite tubular member; and
cutting the composite tubular member into a desired length.

9. A method for manufacturing a tubular member by continuously supplying a plurality of elongate flexible webs while positionally displacing the webs in overlapping relation with side edges thereof arranged in a staircase configuration, progressively bending the webs along a mandrel, bonding the webs with adhesive layers interposed therebetween to form a tubular member, and joining the displaced side edges to complete the tubular member, said method comprising the following steps:
continuously supplying an innermost one of said elongate webs having a thermally fusible layer on a surface thereof facing the mandrel, while longitudinally tensioning said innermost web, said mandrel being disposed to lie at an intermediate position between opposite side edges of said innermost web and having an outer circumferential dimension shorter than the distance between the opposite side edges of said innermost web;

bending said innermost web along said mandrel into a tubular body by moving shaping/guiding members toward and away from said mandrel, said shaping/guiding members having lower edges disposed in confronting relation to each other at an intermediate position between the opposite side edges of said innermost web and upper edges disposed in confronting relation to each other for receiving between them the opposite side edges of said innermost web;

pressing with heat the opposite side edges of said innermost web which project between said upper edges of the shaping/guiding members to fuse the confronting thermally fusible layers to join the opposite side edges;

coating an outer surface of the joined opposite side edges with a hot-melt adhesive; and pressing the outer surface coated with the hot-melt adhesive against the outer surface of the tubular body.

10. A method for manufacturing a tubular member by continuously supplying a plurality of elongate flexible webs while positionally displacing the webs in overlapping relation with said edges thereof arranged in a staircase configuration, progressively bending the webs along a mandrel, bonding the webs with adhesive layers interposed therebetween to form a tubular member, and joining the displaced side edges to complete the tubular member, said method comprising the following steps:

supplying the elongate webs in mutually spaced-apart relation while longitudinally tensioning the webs, each of said webs having a hot-melt adhesive applied on at least one surface thereof;

said mandrel being disposed to lie at an intermediate position between opposite side edges of an innermost one of the webs and extending along the webs;

pressing the webs against the mandrel with a plurality of rollers, each having a pressing surface complementary to a portion of an outer circumferential surface of the mandrel, said rollers being positionally displaced from each other longitudinally of said mandrel and angularly about the axis of said mandrel with longitudinally successive rollers having their pressing surfaces partly overlapped circumferentially about said mandrel for progressively enlarging the bonded area between the webs; and heating the hot-melt adhesive after the application thereof to said at least one surface to maintain the same in a melted condition at least until the webs reach said rollers.

* * * * *